US007938295B2

(12) United States Patent
Wootton

(10) Patent No.: US 7,938,295 B2
(45) Date of Patent: May 10, 2011

(54) APPARATUS FOR PRODUCING MATERIAL BY A CHEMICAL REACTION

(76) Inventor: Shane Richard Wootton, Barnsley (GB)

( * ) Notice: Subject to any disclaimer, the term of this patent is extended or adjusted under 35 U.S.C. 154(b) by 1156 days.

(21) Appl. No.: 11/650,846

(22) Filed: Jan. 8, 2007

(65) Prior Publication Data

US 2010/0230439 A1    Sep. 16, 2010

(30) Foreign Application Priority Data

Jan. 7, 2006  (GB) .................................. 0600258.8

(51) Int. Cl.
 *B67D 7/78* (2010.01)
(52) U.S. Cl. ........... 222/145.5; 222/1; 222/52; 222/135; 222/145.6; 222/309; 222/340; 222/386; 422/224
(58) Field of Classification Search ...... 222/1, 135–136, 222/145.5, 309, 145.6, 386, 94, 52, 63, 385, 222/380, 340, 518, 504–505, 132; 422/133–135, 422/224
See application file for complete search history.

(56) References Cited

U.S. PATENT DOCUMENTS

| | | | | |
|---|---|---|---|---|
| 4,726,933 A | * | 2/1988 | Mayr et al. ..................... | 422/133 |
| 4,832,499 A | * | 5/1989 | Fiorentini .................... | 366/152.1 |
| 5,057,548 A | * | 10/1991 | Urban et al. .................. | 521/170 |
| 5,277,567 A | | 1/1994 | Bauer et al. | |
| 5,984,494 A | | 11/1999 | Chapman et al. | |
| 7,306,119 B2 | * | 12/2007 | Wootton ..................... | 222/145.5 |
| 2003/0072156 A1 | | 4/2003 | Pohlert | |

FOREIGN PATENT DOCUMENTS

| | | |
|---|---|---|
| DE | 19930461 | 1/2001 |
| GB | 2394216 | 4/2004 |
| JP | 7/040337 | 2/1995 |
| WO | WO 03/023512 | 3/2003 |

OTHER PUBLICATIONS

Julie Stout & Theron Sherman; *Polyurethane Mix Head Technologies and Advancements*; Proceedings of Polyurethanes 2004, Oct. 18-20, 2004; pp. 390-393.

* cited by examiner

*Primary Examiner* — Frederick C. Nicolas
(74) *Attorney, Agent, or Firm* — James Creighton Wray

(57) ABSTRACT

A chemical reaction between a first chemical reagent and a second chemical reagent occurs in a mixing chamber arrangement; a dispensing chamber; a dispensing piston configured to dispense reacting mixture from the dispensing chamber; and a control unit for controlling the movement of the dispensing piston and operation of the chemical mixing arrangement. The chemical mixing arrangement has a mixing chamber and injection apparatus configured to produce a jet of a first chemical reagent and a jet of a second chemical reagent such that the jets collide within the mixing chamber to produce reacting mixture. The dispensing chamber has an inlet for receiving the reacting mixture from the mixing chamber and an outlet for dispensing the reacting mixture. The control unit co-ordinates the chemical mixing arrangement to mix the chemical reagents while the dispensing piston is retracted at a controlled rate to enlarge the dispensing chamber.

25 Claims, 23 Drawing Sheets

$$\underbrace{\frac{dV_D}{dt}}_{901} = \underbrace{\frac{dV_M}{dt}}_{902} - \underbrace{\frac{dV_C}{dt}}_{903}$$
Figure 9
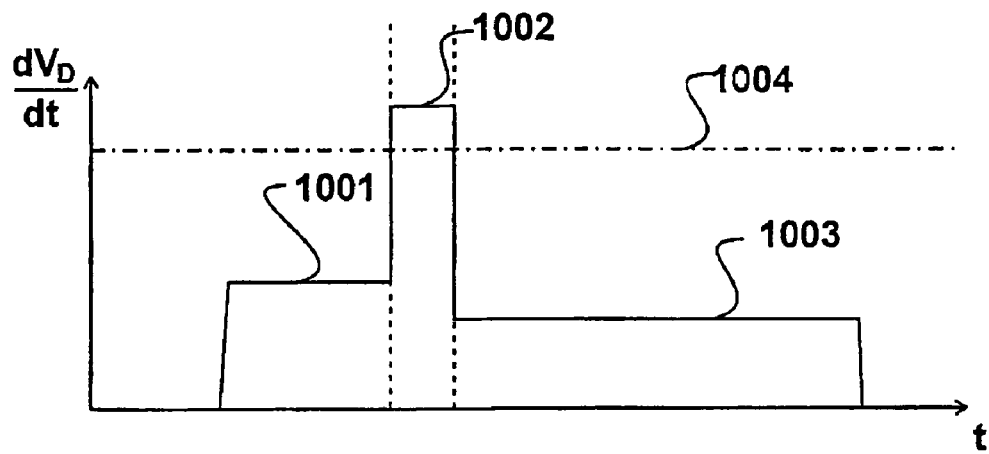
Figure 10A
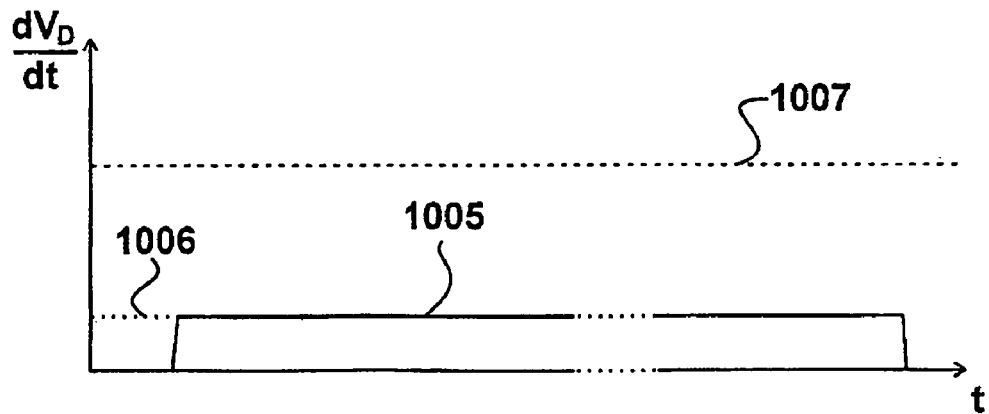
Figure 10B

APPARATUS FOR PRODUCING MATERIAL BY A CHEMICAL REACTION

This application claims the benefit of United Kingdom Application No. GB 06 00 258.8, which is hereby incorporated by reference in its entirety.

BACKGROUND OF THE INVENTION

The present invention relates to apparatus for producing material by a chemical reaction between a first chemical reagent and a second chemical reagent, including a chemical mixing arrangement having a mixing chamber and injection means configured to produce a jet of a first chemical reagent and a jet of a second chemical reagent such that said jets collide within said mixing chamber to produce a reacting mixture.

Apparatus is disclosed in the applicants earlier patent application, published as GB 2 394 216 A, in which chemical reagents are mixed at a high rate of mixing and temporarily stored in a storage chamber. The mixture is then dispensed from the storage chamber at a lower rate by movement of a dispensing piston.

One problem with the known apparatus is that the amount of material that may be temporarily stored and dispensed is limited by the size of the storage chamber.

A second problem is that the rate of dispensing the stored mixture is limited by the maximum speed the dispensing piston can move.

A third problem relates to the fact that the storage chamber is sealed during mixing of reagents. Consequently, when the storage chamber is produced by retracting the dispensing piston a vacuum is formed in the storage chamber. In some cases, this can have undesired effects on the physical properties of the mixture and therefore the final product.

BRIEF SUMMARY OF THE INVENTION

According to a first aspect of the present invention, there is provided apparatus for producing material by a chemical reaction between a first chemical reagent and a second chemical reagent, comprising: a chemical mixing arrangement having a mixing chamber and injection means configured to produce a jet of a first chemical reagent and a jet of a second chemical reagent such that said jets collide within said mixing chamber to produce a reacting mixture; a dispensing chamber having an inlet for receiving said reacting mixture from said mixing chamber and an outlet for dispensing said reacting mixture; a dispensing piston configured to dispense said reacting mixture from said dispensing chamber; control means for controlling the movement of said dispensing piston and for controlling operation of the chemical mixing arrangement such that said movement of said dispensing piston is co-ordinated with said operation of said chemical mixing arrangement, wherein said control means is configured to cause said chemical mixing arrangement to mix said chemical reagents while said dispensing piston is caused to move at a controlled rate.

According to a second aspect of the present invention, there is provided a method of dispensing material produced by a chemical reaction between a first chemical reagent and a second chemical reagent, comprising the steps of: producing a reacting mixture by injecting into a mixing chamber a jet of a first chemical reagent and a jet of a second chemical reagent such that said jets collide and said reagents mix together; allowing said reacting mixture to flow into a dispensing chamber having an outlet for dispensing said reacting mixture; moving a dispensing piston such that said reacting mixture is dispensed from said dispensing chamber; and controlling and co-ordinating the production of said reacting mixture and the movement of the dispensing piston such that the production of reacting mixture occurs while said dispensing piston is moved at a controlled rate.

BRIEF DESCRIPTION OF THE SEVERAL VIEWS OF THE DRAWINGS

FIG. 9 shows the relationship between rate 901 of dispensing the reacting mixture, the rate 902 at which the mixture is produced, and the rate 903 at which the dispensing chamber volume is increased;

FIGS. 10A and 10B each show a graph which illustrate respectively third and fourth modes of operation of the dispensing head 107;

WRITTEN DESCRIPTION OF THE BEST MODE FOR CARRYING OUT THE INVENTION

FIG. 1

Figure 1:
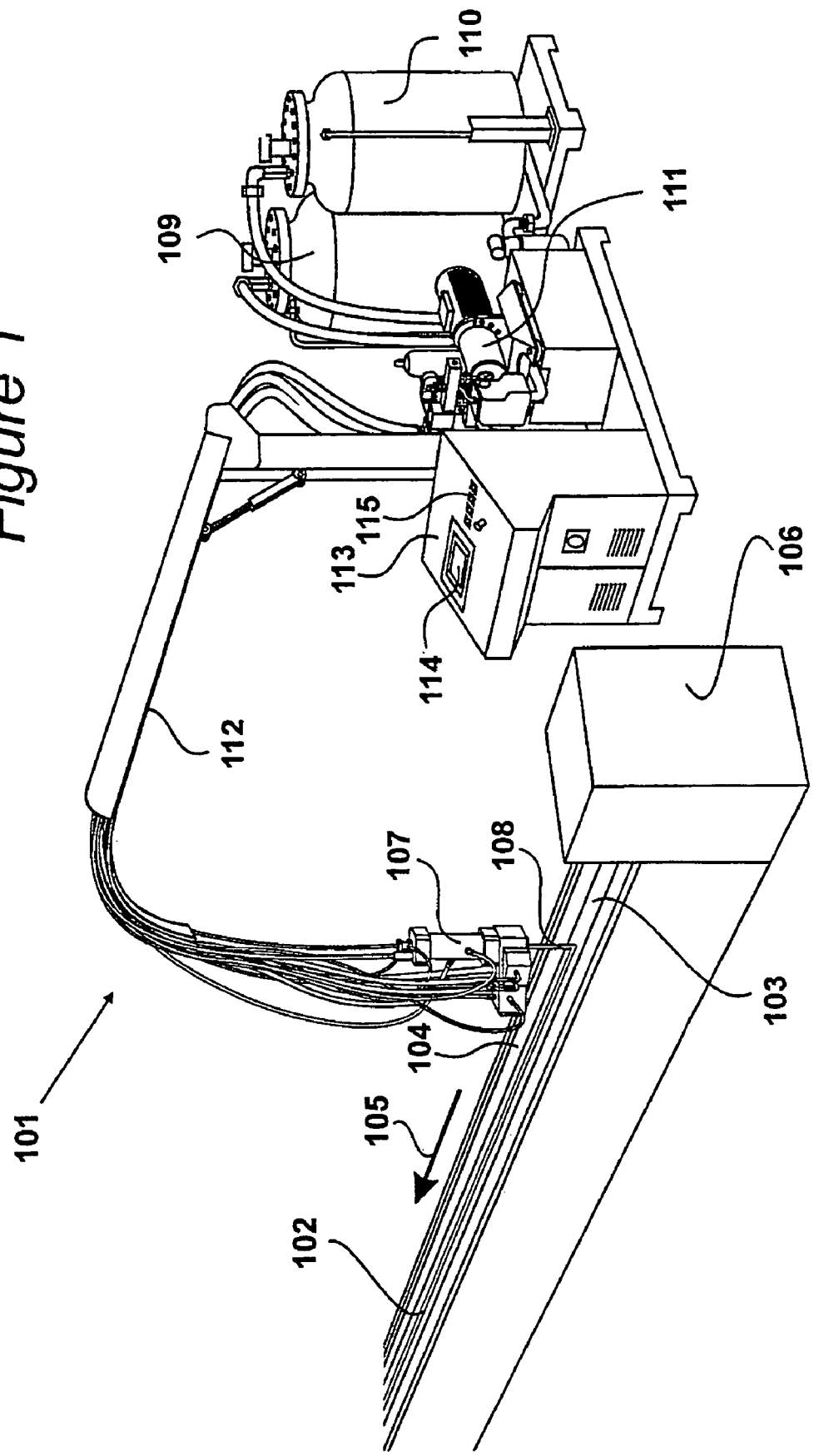
FIG. 1 shows apparatus 101 for producing material by high pressure mixing of a two chemical reagents.

Apparatus 101 for producing material by high pressure mixing of a two chemical reagents is shown in FIG. 1. For the purposes of providing an illustration of the operation of the apparatus, the apparatus 101 is shown in FIG. 1 producing a continuous bead 102 of material. The bead 102 is being laid down onto a paper tape 103 carried by a conveyor belt 104 in direction of arrow 105. The paper tape 103 is supplied from paper feed equipment 106 containing a real of the paper tape. The paper is provided with a release coating, and therefore the bead 102 may be removed when the material is fully reacted. The conveyor 104 is arranged to be sufficiently long such that the material is solid by the time it reaches the end of the conveyor. Consequently, the paper and bead 102 may be wound onto a real for later use, or chopped to required lengths.

The apparatus 101 has a dispensing head 107 in which two chemical reagents are mixed to produce a reacting mixture 108, and, in the present example, the apparatus is arranged to dispense the reacting mixture 108 in a continuous stream at a rate that is less than the rate at which the dispensing head is able to mix material.

The apparatus 101 also includes a first storage container 109 containing a first chemical reagent, and a second storage container 110 in which a second chemical reagent is stored. In the present example, the reacting mixture 108 reacts to produce polyurethane. To this end, the first storage container 109 contains a polyol and the second container 110 contains an isocyanate.

The apparatus also has pumping devices 111 which provide circulation of the chemical reagents to the dispensing head 107 at high pressure. The dispensing head 107 is suspended from a boom 112, which also supports electrical cabling, hydraulic pipes, and pipes carrying the two chemical components to the dispensing head 107.

The overall operation of the device is controlled by a control unit 113, which has a display unit 114, in the form of a liquid crystal display, for providing information to a user. To allow a user to input information to the control unit 113, the unit is provided with user input devices in the form of an array of button switches 115 and a touch sensitive screen on the display unit 114. By user manipulation of the touch screen and/or buttons 115 a user is able to input to the control unit 113 parameters of a task be performed by the apparatus 101.

Within a task, the apparatus may be required to dispense one portion of reacting mixture, as illustrated in the example of FIG. 1, or several portions. For example, a task may require the dispensing head 107 to dispense three portions of mixture into three separate moulds. In addition, each portion will be specified in terms of the mass of mixture to be dispensed and the rate, or rates, at which it is dispensed. For example, in some applications of the apparatus 101, material may be dispensed at a constant rate, as illustrated in FIG. 1, while in other applications one stage of dispensing a portion of mixture may be performed at an higher rate compared to another stage of dispensing the same portion. Thus, the parameters input to the control unit 113 will include mass of material to be dispensed, the number of portions to be dispensed and the rates at which the portions will be dispensed.

In addition, it is known to adjust the ratio of the chemical reagents to provide a required change in the properties of the generated material. (The ratio is typically adjusted by less than plus or minus ten percent, by adjusting the ratio of the reagent injection pressures within allowed tolerances.) Thus, the input parameters may also include the ratio of the two chemical reagents.

FIG. 2

Figure 2:
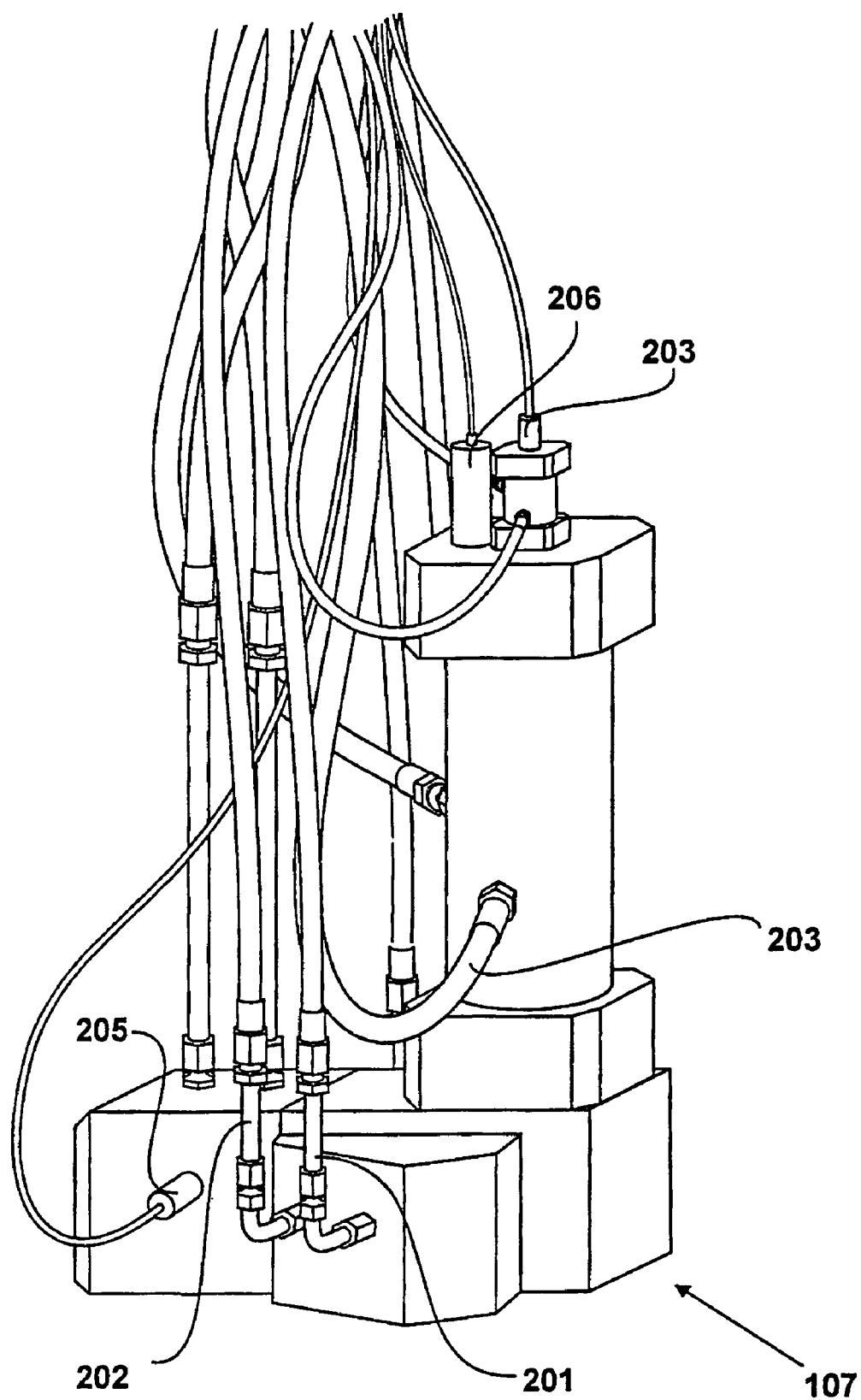
FIG. 2 shows the dispensing head 107 in further detail.

The dispensing head 107 is shown in further detail in FIG. 2. The dispensing head receives the first chemical reagents via pipe 201, and a second pipe 202 allows it to be returned to the first storage container 109. Similar pipes are provided for the supply of the second reagent to the other side of the dispensing head.

The head 107 is also supplied with pipes carrying hydraulic fluid, such as pipe 203. Hydraulic pressure is used to energise the moving components of the dispensing head 107, and the purpose of the hydraulic fluid will be described in detail below.

In addition, electrical connections are made to proximity sensors 204 and 205 as well as a position sensor 206.

FIG. 3

Figure 3:
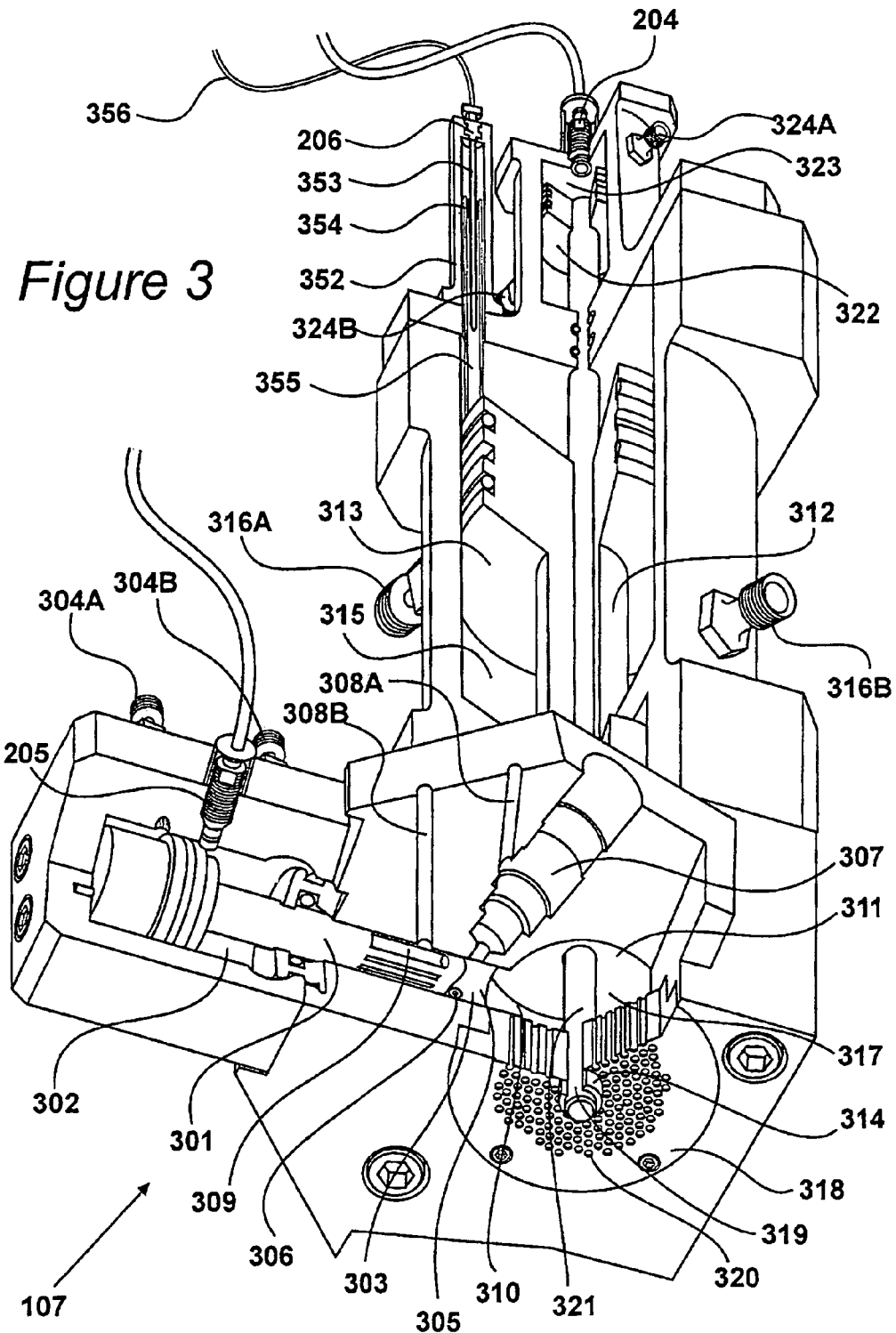
FIG. 3 shows a cut-away view of the dispensing head 107, providing details of its internal structure.

A cut-away view of the dispensing head 107, providing details of its internal structure, is shown in FIG. 3. The dispensing head 107 has a production piston 301, which has a rear end located within a hydraulic cylinder 302 and a front end located within a material production cylinder 303. The piston 301 is moved between its fully forward and fully retracted position at high speeds by means of hydraulic pressure applied via hydraulic fluid connectors 304A and 304B.

In the retracted position, illustrated in FIG. 3, the front face of the piston 301 and the wall of the production cylinder 303 define a production chamber 305 with a volume of approximately one cubic centimetre. During production, the first and second chemical reagents are injected at high pressure into the production chamber 305 via a respective one of two jets. The nozzle 306 of one of the jets is shown in FIG. 3, while the location of the second jet is indicated at 307. The jets are arranged so that each of the chemical reagents enters the production chamber as a jet of liquid and violently collides with the other jet of liquid at high velocity. This provides efficient mixing of the two reagents, to form a reacting mixture and the resulting chemical reaction produces material (for example polyurethane foam).

Inlet duct 308A allows chemical reagent to be supplied to the jet located at 307, while outlet duct 308B allows the same non-reacted reagent to be removed from the dispensing head 107. (Similar inlet and outlet ducts are provided for the other jet.) A pair of closed ended slots 309 are provided in the piston 301 so that when the piston 301 is in its forward position, the chemical reagents may be circulated at high pressure through the inlet ducts, such as 308A, through their respective jets, through a respective slot 309, and out through an outlet duct, such as 308B. By this means, the reagents may be circulated through the jets at high pressure prior to mixing to allow the mixing pressure to be established and stabilised. The production piston 301 is then retracted at high speed, and the high pressure jets of reagent collide. When a required weight of material has been produced, the piston 301 is moved forwards at high speed to stop production, and the chemical reagents are again allowed to circulate through slots 309. Thus, the high pressure jets are switched on and off very quickly without unacceptable pressure build up in chemical reagent supply circuits.

The production chamber has one end open to a dispensing cylinder 310 which contains the lower end 311 of a dispensing piston 312. The upper end 313 of the piston 312 is located in a second hydraulic cylinder 315 so that the piston 312 may be pushed downwards or upwards by applying hydraulic fluid pressure via hydraulic connectors 316A and 316B.

In retracted positions, as shown in FIG. 3, the front face of the piston 312 and the wall of the dispensing cylinder 310 define a dispensing chamber 317. An end-plate 318 provides a lower wall to the chamber 317 at its lower end. At its centre, the end-plate 318 has a nozzle 314 defining a circular aperture which provides an outlet 319 through which material in chamber 317 is dispensed. During operation material generated in the production chamber 305 passes through its open end into the dispensing chamber 317. Thus the open end of the production chamber 305 defines an inlet for the dispensing chamber 317.

It should be noted that within the dispensing head 107, the inlet to the dispensing chamber 317 from the production chamber 305 is located next to the lower wall of the dispensing chamber. Thus, the inlet is positioned such that the dispensing piston 312 allows mixture to flow from the production chamber into the dispensing chamber whenever it is not in its fully forward position. This feature is made use of when the dispensing head performs some of the operations described below.

An array of smaller ducts 320 are provided through the end-plate 318, such that each duct 320 provides a passage from the chamber 317 to an outer surface of the end-plate. Over time, there is a tendency for fully reacted material to build up on the inner surface of the end-plate 318. This unwanted material is periodically removed by extruding it through the ducts 320 under pressure of the dispensing piston 312. This purging operation was described in the applicants earlier patent application published as GB 2 394 216 A. However, during general use, it is arranged for the ducts 320 to be full of solid reacted material which provides a plug to prevent leakage of non-reacted material.

The dispensing piston 312 has a circular bore extending along its axis and an output control rod 321 is located within said bore. The upper end of the rod 321 is attached to a piston 322 located within a third hydraulic cylinder 323, and, thus, by applying hydraulic pressure to the piston 322 via hydraulic connectors 324, the rod 321 may be moved between a forward and a retracted position. In the retracted position, the lower end of rod 321 is located within the dispensing chamber 317, and material located within said chamber may be dispensed through outlet 319. When the rod 321 is in its forward position, its lower end is located within the outlet 319 and it has a sufficiently good fit within said port to prevent material within the chamber 317 from escaping. The output control rod 321 therefore provides a means of closing the outlet 319. However, in addition, it provides a means of clearing the outlet of material.

Typically, the output control rod 321 has a diameter of eight to fifteen millimetres and in the present example it has a diameter of ten millimetres.

In use, the pistons 301 and 322 are required to be fully forward or fully retracted. In order to provide data to the control unit 113 informing of their status, the relevant cylinders are provided with the proximity switches 205 and 204 respectively.

The sensor 206 is arranged to provide a measure of the position of the dispensing piston 312 at all positions as its lower end 311 moves along the dispensing chamber 317. During some modes of operation of the dispensing head 107, material produced in chamber 305 is temporarily stored in dispensing chamber 317, and accurate quantities of material are then dispensed by moving the dispensing piston forward by a controlled amount. During such types of operation, a signal relating to the position of the dispensing piston is generated and sent to the control unit 113 by the position sensor 206.

The sensor 206 is a linear conductive plastic position transducer located in a housing 352 which extends from the upper end of the second hydraulic cylinder 315. The sensor 206 has a conductive plastic portion 353 rigidly fixed to the upper end of the housing 352, and a wiper 354 rigidly fixed to the upper end of a guide tube 355. The guide tube is itself rigidly attached to the upper end 313 of the piston 312, and thus, as the piston 312 moves up or down, the wiper 354 is moved in a corresponding manner along the conductive plastic portion 353. An electrical reference voltage is supplied to the sensor 206 and a voltage signal indicative of the wiper's position is received from the sensor by means of electrical cable 356.

In the present embodiment the sensor 351 is a conductive plastic in cylinder transducer with a stroke length of 150 mm, manufactured by Variohm-Eurosensor Ltd. in the UK under reference number P6403-100-H003.

In an alternative embodiment, a linear encoder is used in place of the position sensor 206. Consequently, instead of analogue signals being supplied to the control unit 113, the linear encoder provides digital signals.

FIG. 4

Figure 4:
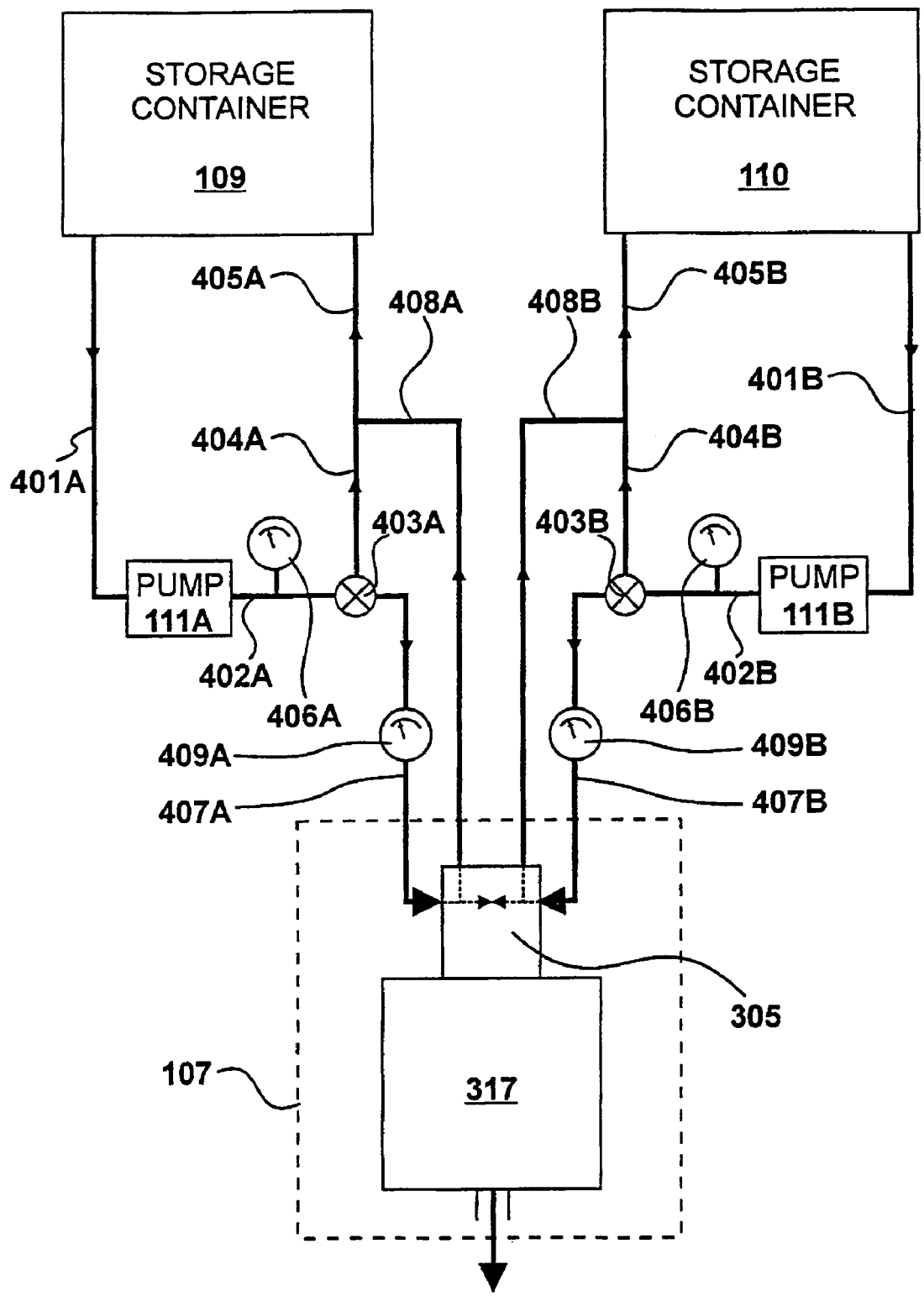
FIG. 4 shows a schematic diagram illustrating the flow of chemical reagents within the apparatus of FIG. 1.

A schematic diagram illustrating the flow of chemical reagents within the apparatus 101 of FIG. 1, is shown in FIG. 4.

When the apparatus is not producing material, chemical reagents stored in storage containers 109 and 110 are circulated around a circuit at low pressure. Thus, the first chemical reagent stored in storage container 109 is circulated by a first pumping device 111A through pipe 401A, pipe 402A, a first stream distributor valve 403A, and back to the container 109 through pipe sections 404A and 405A. Similarly, the second chemical reagent stored in storage container 110 is circulated by a second pumping device 111B through pipe 401B, pipe 402B through a second stream distributor valve 403B, and back through pipe sections 404B and 405B.

Fluid pressure gauges 406A and 406B are located on pipes 402A and 402B respectively and measure the respective pressures of the chemical reagents as they leave pumping devices 111A and 111B. The pressure gauges provide a digital signal indicative of the measured pressures back to the control unit 113, as well as providing a visual display for a user of the apparatus 101.

Immediately prior to material production, the stream distributor valves 403A and 403B are switched to prevent flow through pipe sections 404A and 404B and to allow the chemical reagents to be circulated to the dispensing head 107. Consequently, the first chemical reagent is circulated through pipe sections 401A, 402A and 407A to the dispensing head 107, and when the production piston 301 is in its forward position, said reagent is returned via pipe sections 408A and 405A to the container 109. Similarly, the second chemical reagent is circulated through pipe sections 401B, 402B and 407B and returned via pipe sections 408B and 404B. Alternatively, when the production piston is retracted, reagents fed to the head via pipes 407A and 407B are injected into the mixing chamber 305 where they collide to produce the reacting mixture.

Fluid flow meters 409A and 409B are located on pipes 407A and 407B respectively, and provide a signal to the control unit 113 indicative of the rate of flow of reagents along said pipes. Consequently, when the production piston is retracted, the rate at which the mixture is being produced in the dispensing head is determined by the control unit 113 from the received flow measurements.

The pump devices 111A and 111B each comprise a pump that is driven by an AC motor under the control of an inverter. The inverter itself receives control signals from the control unit 113, and thus the control unit controls the pumping speeds of the pumping devices. Consequently, the control unit 113 is able to adjust and stabilise the pressures measured on the pressure meters 406A and 406B by controlling the pumping speeds of pumping devices 111A and 111B before mixing is commenced, and to make a limited amount of adjustment to reagent flow as measured by flow meters 409A and 409B during mixing.

FIG. 5

Figure 5:
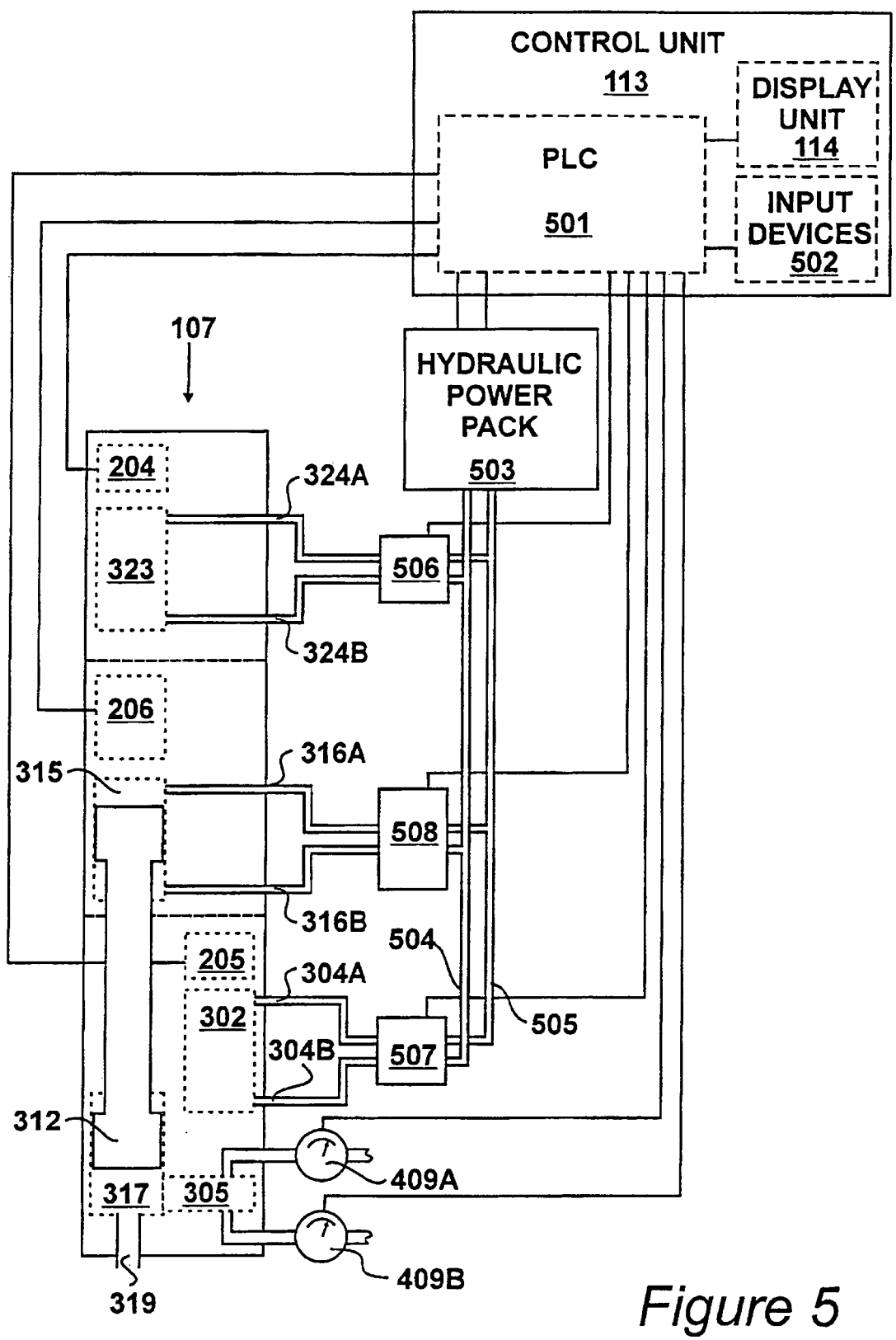
FIG. 5 shows a schematic diagram illustrating the control unit 113, the dispensing head 107 and the hydraulic system of apparatus 101.

A schematic diagram illustrating the control unit 113, the dispensing head 107 and the hydraulic system of apparatus 101 is shown in FIG. 5. The control unit 113 contains a programmable logic controller (PLC) 501 arranged to control operations performed by the dispensing head 107, and apparatus associated with dispensing head. In addition, the PLC is arranged to provide viewable data to the display unit 114 and to receive user inputs from input devices 502 which include the touch screen of the display unit and the button switches 115. The PLC 501 comprises a central processing unit and associated memory in the form of random access memory (RAM) and flash memory. The flash memory is used to store program code, while the RAM is used to temporarily store program code, data input to the PLC, data received from external devices, data produced during calculations, etc.

The PLC may be, for example, a Simatic S7-400 as produced by Siemens.

The hydraulic system of the apparatus 101 includes a hydraulic power pack 503 having: a hydraulic fluid tank; a high pressure piston pump; working pressure gauges; two hydraulic accumulators; and a hydraulic intensifier. The pump is capable of charging a first of the accumulators to its working pressure of two hundred bar for normal operation of the three hydraulic pistons within the dispensing head. It is necessary for the correct operation of the apparatus that the fluid pressure from this first accumulator is kept at a stable value in order to ensure accurate and repeatable operation of the dispensing piston 312. Consequently, the accumulator capacity is chosen to be large compared to the total amount of fluid flow into the cylinders 302, 315 and 323. In the present example, the accumulator has a capacity of 13 litres compared to a total volume of the cylinders of approximately 1 litre.

The hydraulic intensifier is used to charge the second accumulator to a pressure of four hundred bar, for use when a purging operation is required to extrude unwanted solid material from the dispensing chamber.

The hydraulic power pack 503 has an outlet connected via a feed line 504 and a return line 505 to two two-way hydraulic directional control valves 506 and 507 as well as a proportional valve 508.

The control valve 506 connects either one of the connectors 324A and 324B of hydraulic cylinder 323 to the feed line 504 and the other one of said connectors to the return line 505. The control valve 506 is arranged to be switched between its two positions under the control of PLC 501. Therefore, when the control valve 506 is switched to a first position the feed line is connected to the connector 324B and the output control rod 321 is retracted thereby opening the outlet 319. Similarly, when the control valve 506 is switched to a second position the feed line is connected to the connector 324A and the output control rod 321 is lowered thereby closing the outlet 319.

The PLC 501 receives signals from the proximity sensor 204 informing the PLC of the position, either forward or retracted, of the output control rod 321.

The control valve 508 connects either one or the other of the connectors 304A and 304B of hydraulic cylinder 302 to the feed line 504 and the other one of said connectors to the return line 505. The control valve 507 is also arranged to be switched between its two positions under the control of PLC 501. Therefore, when the control valve 507 is switched to a first position the feed line is connected to the connector 304B and the production piston 301 is retracted, thereby allowing mixing of the reagents to take place. Similarly, when the control valve 507 is switched to a second position the feed line is connected to the connector 304A and the production piston 301 is pushed forward, thereby terminating mixing of the reagents.

The PLC 501 is arranged to receive signals from the proximity sensor 205 informing the PLC of the position, either forward or retracted, of the production piston 301.

In the present embodiment the hydraulic control valves 506 and 507 are manufactured by Atos (RTM) with reference number DHI-0631/2-00.

A requirement of the dispensing piston 312 is that it may be moved forwards and backwards at controlled rates and held at any position between a fully forward position and a fully retracted position. Consequently, a proportioning valve 508 is used to control its movement. In the present embodiment, the proportioning valve 508 is a proportional valve (cetop3) series DLHZO, driven by electronic driver series E-ME-T-2H under the control of a closed loop controller series E-ME-K-PID, all manufactured by Atos (RTM).

The proportioning valve 508 is arranged: to connect either one or the other of the connectors 316A and 316B of hydraulic cylinder 315 to the feed line 504 and the other one of said connectors to the return line 505, to cause movement of the dispensing piston 312; or alternatively, to connect neither of said connectors to the feed or return line, thereby preventing movement of said piston. In addition, the proportioning valve 508 is arranged to allow hydraulic fluid to flow to either one or the other of said connectors 316A and 316B at a controlled variable rate under the control of PLC 501, such that the dispensing piston is correspondingly moved forwards or backwards at a controlled variable rate.

The amount by which the proportioning valve opens, in either direction, depends upon the value of a voltage it receives from the PLC.

To enable the PLC 501 to accurately control the rate of movement of the dispensing piston 312, firstly, the hydraulic pressure provided by the hydraulic pack 503 is maintained at a stable pressure, and secondly, the rate of movement of the dispensing piston is measured by the PLC for various values of voltage applied to the proportioning valve. These measurements are made in a calibration procedure before commencement of production.

Thirdly, during operation, while the dispensing piston 312 is being moved, the PLC 501 receives signals from the position sensor 206 providing positional values for the dispensing piston 312. Consequently, the PLC calculates the rate of movement of the dispensing piston from these positional values and adjusts the voltage it applies to the proportioning valve 508.

As shown in FIG. 5, the PLC 501 is also connected to the chemical reagent flow meters 409A and 409B. Consequently, as mentioned above, the PLC 501 receives data from the flow meters 409A and 409B from which it determines whether the reagents are being mixed at the required rate. If the rate of mixing is determined to be lower or higher than the required rate, then the rate of movement of the dispensing piston may be corresponding reduced or increased by the PLC 501.

FIG. 6A to 6F

Depending upon the rate at which material is to be dispensed from the dispensing head 107, and the quantity of material to be dispensed, the apparatus 101 operates in one of several different modes of operation. Similar to other high pressure dispensing heads, dispensing head 107 is able to mix material over a range of rates depending upon adjustments made to its jets, and rates of pumping of the chemical reagents. However, below a minimum rate of mixing, mixing of the chemical reagents within the dispensing head 107 becomes too inefficient to achieve successful results. Consequently, if material is to be dispensed at a rate that is greater than the minimum rate of mixing, then the apparatus 101 operates in a first mode of operation in which material is dispensed as it is mixed, but if material is to be dispensed at lower rates then the apparatus 101 operates in one of its alternative modes.

FIGS. 6A to 6F illustrate sequential steps in the first mode of operation of the dispensing head 107. The dispensing head 107 is shown schematically in FIG. 6A in its post-production configuration, and thus it is in a position to begin a new production cycle. The production piston 301, the dispensing piston 312 and the output control rod 321 are all in their fully forward positions. The dispensing head has been used, or has been prepared for use as described in the applicants earlier patent application published as GB2394216A. Consequently, a layer 601 of fully-reacted, solid material exists between the dispensing piston 312 and the inner surface of the end-plate 318, and which extends through the ducts 320.

Within a predefined period prior to production of material, the chemical regents are circulated through inlets 308A and 608A through the respective jets and slots 309 in the production piston 301, and out through outlets 308B and 608B.

Figure 6A:
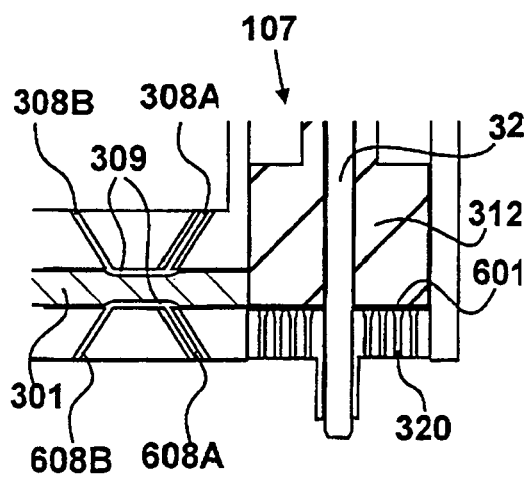
FIGS. 6A to 6F illustrate sequential steps in the first mode of operation of the dispensing head 107.
Figure 6B:
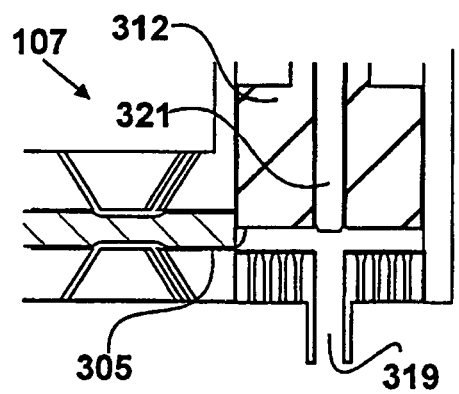

The configuration of the dispensing head immediately prior to production in the first mode is shown in FIG. 6B. The dispensing piston 312 has been retracted to a pre-defined throttling position is which it only partially covers the inlet from the production chamber 305. In the present example, approximately half of the inlet is covered by the end of the dispensing piston 312. The output control rod 321 is retracted such that the output port 319 is open.

Figure 6C:
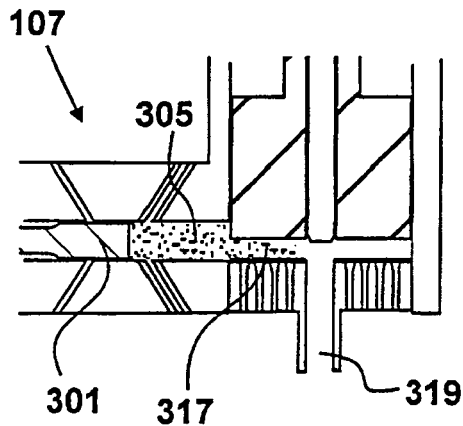

Production then takes place by the retraction of the production piston 301 as illustrated in FIG. 6C, and the consequent mixing of the chemical reagents within production chamber 305.

Due to the high energies of the jets, the two chemical reagents are generally thoroughly mixed on impact, but it has been known for mixing to be less efficient at the instant when mixing is commenced. This may lead to pockets of non-reacted material in the finished product. However, in the present embodiment, mixing is assisted in the initial stages by the dispensing piston throttling the inlet to the dispensing chamber 317.

Figure 6D:
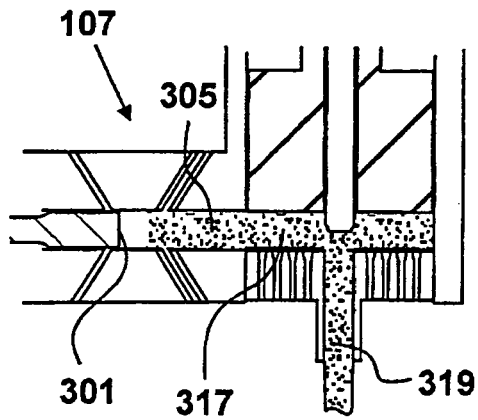

Once mixing has begun, the dispensing piston 312 is retracted such that it clears the end of the production chamber 305. The dispensing head is shown in FIG. 6D during production with the dispensing piston retracted to clear the end of the production chamber 305. Thus, the newly produced material is unrestricted by the dispensing piston as it passes from the production chamber 305, through dispensing chamber 317 and out through the output port 319.

Figure 6E:
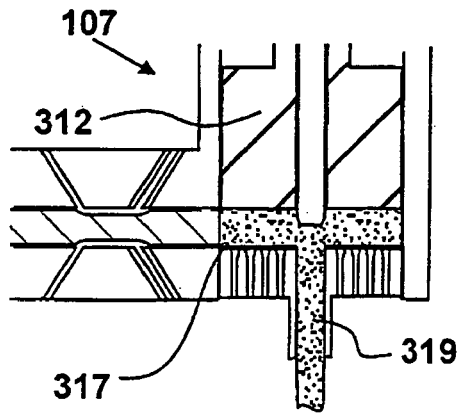

When material has been produced for the required time, and the required quantity of material has been produced, the production piston is moved to its forward position to end production. This situation is illustrated in FIG. 6E, in which production of material has ended, but some material still occupies the dispensing chamber 317. The dispensing piston 312 is immediately moved forwards to dispense the remaining material through the output port 319.

Figure 6F:
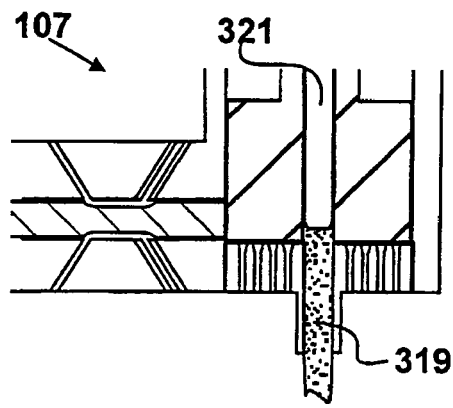

FIG. 6F shows the status of the dispensing head after the dispensing piston 312 has been moved fully forward. Under the very high pressure which may be exerted by the dispensing piston, only a very small quantity of liquid material remains trapped between the dispensing piston 312 and the upper surface of the solid material layer 601. A small quantity of liquid material is inevitably trapped, but, after fully reacting, this merely adds to the thickness of the solid material layer 601.

Immediately after moving the dispensing piston to its fully forward position, the output control rod 321 is also moved to its fully forward position to eject the remaining material from the dispensing chamber output port 319. After this movement, the dispensing head is once again in its post-production configuration illustrated in FIG. 6A.

FIGS. 7A to 7F

A second mode of operation of the dispensing head 107 is illustrated by FIGS. 7A to 7F.

Figure 7A:
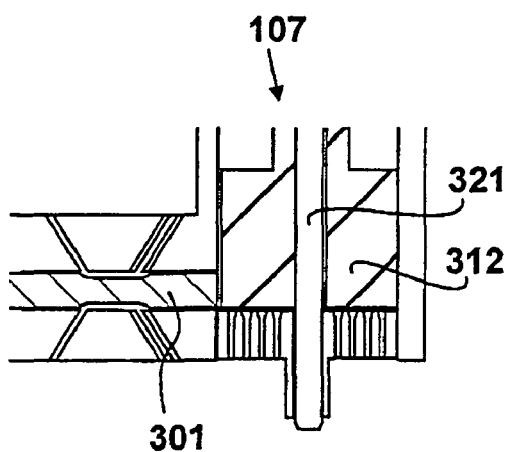
FIGS. 7A to 7F illustrate a second mode of operation of the dispensing head 107.

The dispensing head 107 is shown in FIG. 7A in its post-production configuration. Thus, FIG. 7A is merely a copy of FIG. 6A, provided to facilitate illustration of the second mode. Since the dispensing head is between production cycles, the production piston 301, the dispensing piston 312 and the output control rod 321 are each in their fully forward positions.

In the second mode of operation, the reagents are mixed and the mixture is stored in the dispensing chamber Then, immediately after mixing has finished, the stored material is dispensed.

Figure 7B:
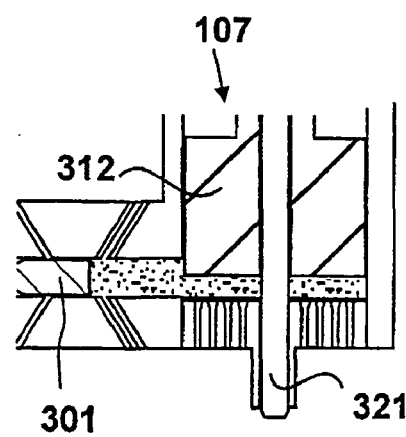

Initially, the output control rod 321 remains in the closed position and the production piston 301 is retracted, such that mixing commences, while the dispensing piston is retracted at a rate which depends upon the rate of mixing of material. Specifically, the dispensing piston 312 is retracted at such a rate that the rate of increase in volume of the dispensing chamber 317 is equal to the rate of increase of volume of the reacting mixture produced by mixing the reagents. Consequently, the reacting mixture fills the dispensing chamber 317 as it is produced. By this method, the reacting mixture is supplied to the dispensing chamber without it being exposed to air, or to a vacuum. The dispensing head is illustrated in FIG. 7B just after commencement of mixing, and with the dispensing piston being retracted to create the dispensing chamber as mixture is generated.

In the present embodiment, the lower part 311 of the dispensing piston 312 has a diameter of 50 mm, and the output control rod has a diameter of 10 mm. The area of piston used to dispense material from the dispensing chamber 317 is therefore 1885 mm$^2$ (=$\Pi \times 25^2 - \Pi \times 5^2$) and consequently 1 ml (1000 mm$^3$) of material may be dispensed from the chamber 317 by a movement of 0.53 mm (1000/1885). Therefore, for example, if material is mixed at a rate of 50 millilitres per second the dispensing piston is retracted at a rate of 26.5 millimetres per second (50×0.53).

When the required volume of material has been produced, the production piston 301 is pushed forward to stop further mixing taking place, and the dispensing piston is also stopped. The dispensing head 107 is shown again in FIG. 7C at with the production piston in the rearward position, the dispensing chamber 317 is charged with mixture and the dispensing piston stationary.

The material stored in the dispensing chamber 317 must now be dispensed before the end of a known period of time. In the case of polyurethane, it has been found that the reacting mixture maybe stored and dispensed, within a finite time period of typically twenty seconds.

Figure 7C:
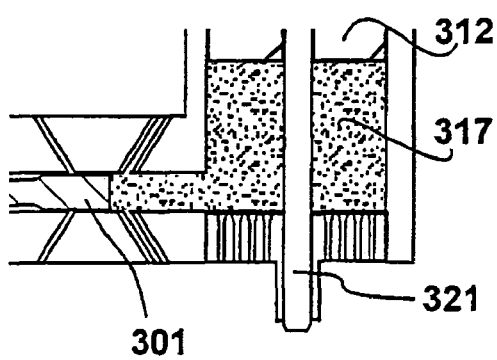
Figure 7D:
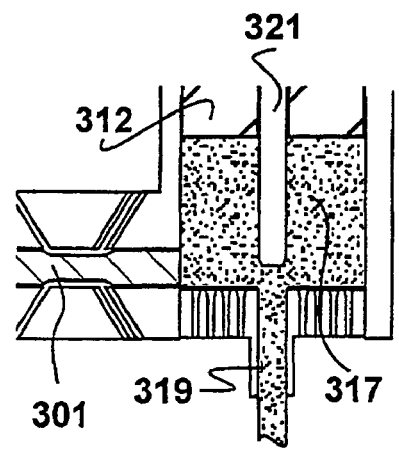

To allow dispensing to take place, the control rod 321 is withdrawn to open the output port 319, as shown in FIG. 7D. The material is then dispensed at a controlled rate by moving the dispensing piston 312 forward at a corresponding controlled rate.

Figure 7E:
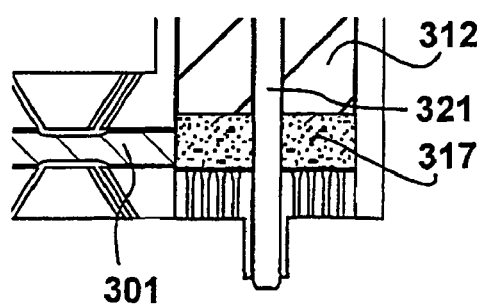

In cases where the apparatus is required to dispense several portions of mixture, where each portion contains only a small volume of material, the dispensing piston is moved forward by a distance calculated to dispense that volume. The dispensing piston 312 is then stopped and the outlet closed by lowering the control rod 321. For example, the dispensing head 107 is shown in FIG. 7E after dispensing a small portion of material and therefore the outlet 319 is closed and the dispensing piston is stationary. The outlet 319 is then re-opened by retracting the control rod 321 and lowering the dispensing piston 312 to dispense one or more further portions of the mixture at a controlled rate.

Figure 7F:
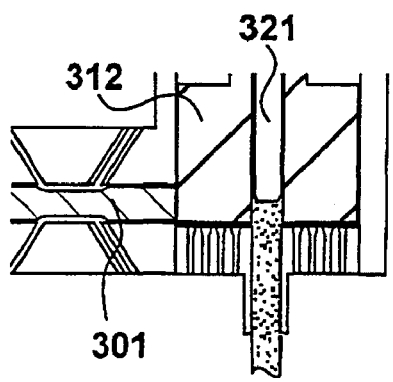

The dispensing chamber 317 is thus voided of material by lowering the dispensing piston 312 to its fully forward position as shown in FIG. 7F before the control rod 321 is lowered to clear the nozzle 319 of material. The dispensing head will thus return to its configuration shown in FIG. 7A.

Figure 8A:
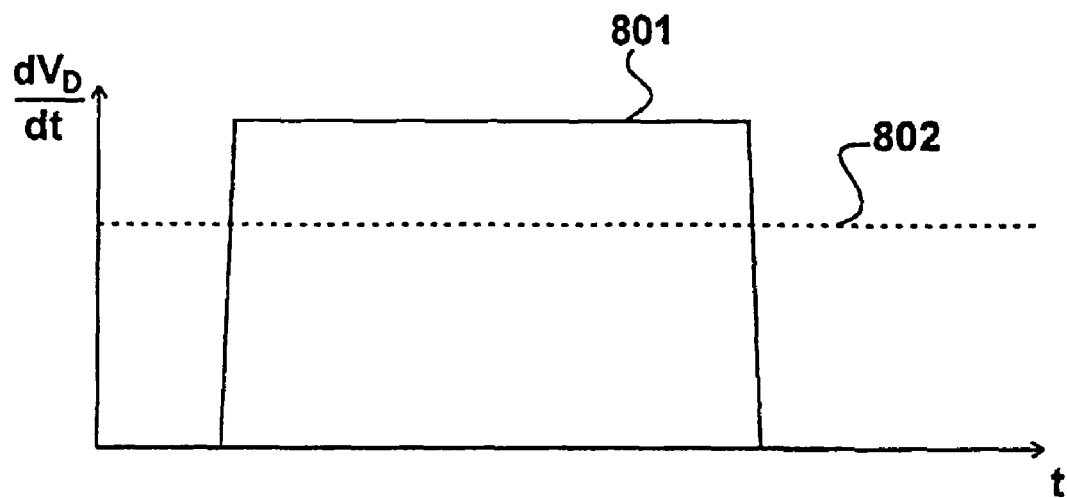
FIG. 8A shows a graph illustrating the rate that material is output from the dispensing head 107 in the mode illustrated by FIGS. 6A to 6F.
Figure 8B:
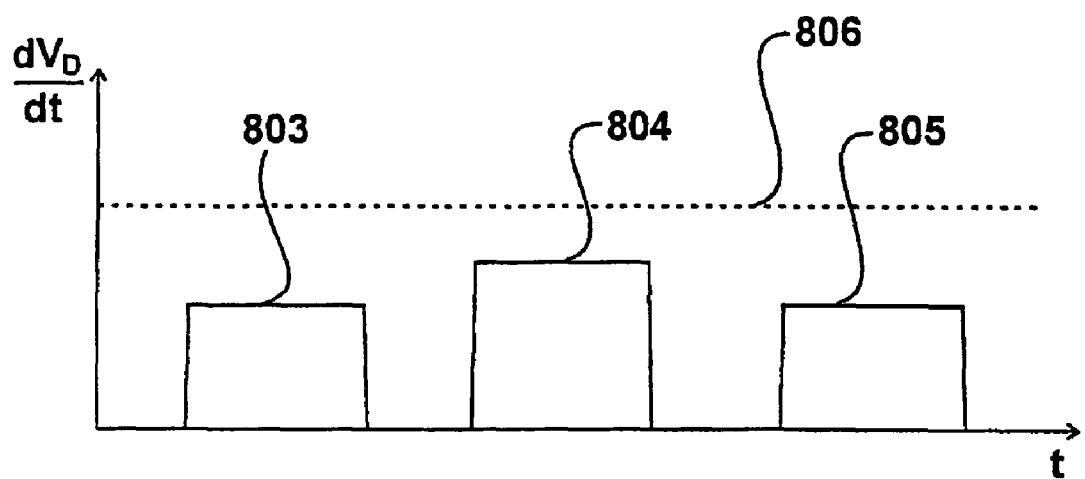
FIG. 8B shows a graph illustrating output rates that may be provided by the mode of FIGS. 7A to 7F.

FIGS. 8A and 8B

A graph illustrating the material output from the dispensing head 107 in the mode illustrated by FIGS. 6A to 6F is shown in FIG. 8A, while a similar graph in FIG. 8B illustrates output that may be provided by the mode of FIGS. 7A to 7F.

In each of the graphs time is represented along the horizontal axis and rate of dispensing of material by volume is represented along the vertical axis.

In the case of FIG. 8A, material is dispensed as it is mixed and therefore the rate of dispensing takes place at a substantially constant rate indicated by horizontal line 801. This rate is higher than the minimum mixing rate indicated by dotted line 802.

In the graph of FIG. 8B, the dispensing chamber was charged with material and then three separate portions of material were dispensed as illustrated by graph portions 803, 804 and 805. As illustrated by the graph, the portions were each dispensed at a rate that was less than the minimum mixing rate, indicated by dotted line 806. However, the required rate of dispensing varied from one portion to another, and therefore portion 804 was dispensed at a higher rate than portions 803 and 805.

FIG. 9

Each of the above modes of operation make use of the apparatus's ability to control operation of the dispensing head 107 such that the movement of the dispensing piston is co-ordinated with the operation of production piston, and to cause the dispensing head 107 to mix the chemical reagents while the dispensing piston is caused to retract at a controlled rate.

In the following described modes of operation, the ability of the apparatus 101 to mix chemical reagents while moving the dispensing piston is made use of while the apparatus is dispensing material. In each case it has been appreciated that the rate 901 of dispensing the reacting mixture (by volume), $dV_D/dt$, is approximately equal to the rate 902 at which the mixture is produced (by volume), $dV_M/dt$, minus the rate 903 at which the dispensing chamber volume is increased, $dV_C/dt$. This relationship is shown in FIG. 9.

FIGS. 10A and 10B

A graph is shown in each of FIGS. 10A and 10B which illustrate third and fourth modes of operation of the dispensing head 107.

In the graph of FIG. 10A one portion of material is dispensed in such a manner that material is dispensed at a different rate in each of three stages 1001, 1002 and 1003.

The dispensing piston is able to move forward at various rates over a range of speeds. However, there is inevitably an upper limit to the rate at which the dispensing piston is able to dispense material. This will depend upon the physical parameters of the apparatus, such as the hydraulic pressure used, the diameters of the dispensing piston, viscosity of the mixture, etc. The horizontal line 1004 illustrates the maximum rate at which the dispensing head 107 is able to dispense material by movement of its dispensing piston 312. During the stage 1002, the dispensing rate is higher than this maximum, and this is achieved by temporarily restarting the mixing process while moving the dispensing piston at a rate calculated from the mixing rate. For example, if a dispensing rate of 80 ml per second is required, and the dispensing head is set up to mix material at a rate of 50 ml per second, then material is mixed at 50 ml per second while the dispensing chamber is reduced in volume at a rate of 30 ml per second by movement of the dispensing piston. For the current example, where the dispensing piston area is 1885 mm$^2$, this would be achieved by a piston speed of 15.9 millimetres per second (30000 mm$^3$ s$^{-1}$÷1885 mm$^2$).

As described above, the PLC continuously monitors the rate at which material is mixed from signals received from flow meters 409A and 409B, and therefore the dispensing piston speed may be adjusted from this calculated speed in dependence of said received signals.

The third mode of operation of the dispensing head will be further described below with reference to FIG. 11A to 11C.

In the graph of FIG. 10B, one portion 1005 of material is dispensed over a prolonged period of time at a dispensing rate 1006 which is lower than the minimum mixing rate 1007 of the dispensing head 107. The volume of the material dispensed is greater than the maximum volume that may be stored in the dispensing chamber 317. This is achieved by operating the dispensing head 107 in a fourth mode in which the dispensing chamber is refilled while dispensing continues. This fourth mode will be described in detail below with reference to FIGS. 12A to 12D.

FIGS. 11A to 11D

Figure 11A:
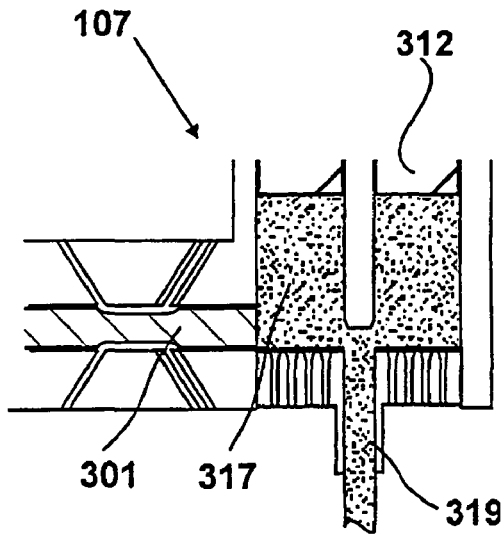
FIG. 11A to 11C show the dispensing head 107 at various configurations during an example of the third dispensing mode.
Figure 11B:
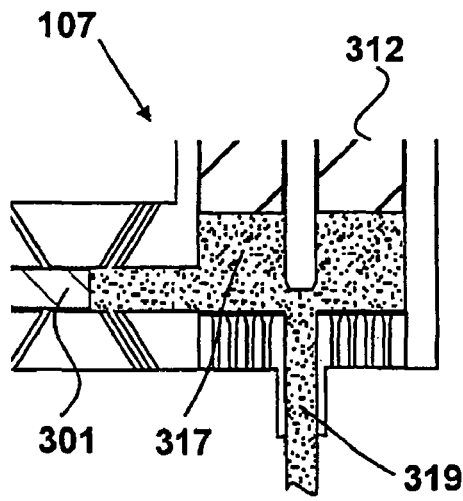
Figure 11C:
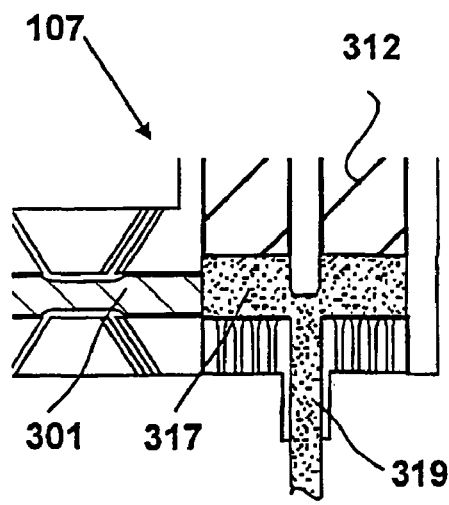

The dispensing head 107 is shown schematically in FIG. 11A to 11C at various configurations during a task which provides an example of the third dispensing mode. As described above with reference to FIG. 10A, in this third mode the dispensing head 107 dispenses portions of material such that at one stage material is dispensed by movement of the dispensing piston alone, and at another stage material is dispensed while the chemical reagents are being mixed.

In the third mode of operation, the dispensing chamber is charged with reacting mixture as described with reference to FIGS. 7A to 7C. In the present example, the control rod 321 is then retracted and the dispensing piston 312 is moved downwards at a predetermined rate to dispense a first predetermined amount of the material stored in the dispensing chamber 317 as shown in FIG. 11A. After dispensing the first predetermined amount of material, the production piston 301 is retracted as shown in FIG. 11B, and, consequently, material is dispensed from the nozzle 319 at a higher rate which depends upon the rate of mixing and the rate of movement of the dispensing piston 312. When the required volume of material has been dispensed at the higher rate the production piston is returned to its forward position as shown in FIG. 11C and dispensing is continued by movement of the dispensing piston alone.

FIGS. 12A to 12D

The dispensing head 107 is shown schematically in FIG. 12A to 12D at various configurations during an example of the fourth dispensing mode.

Figure 12A:
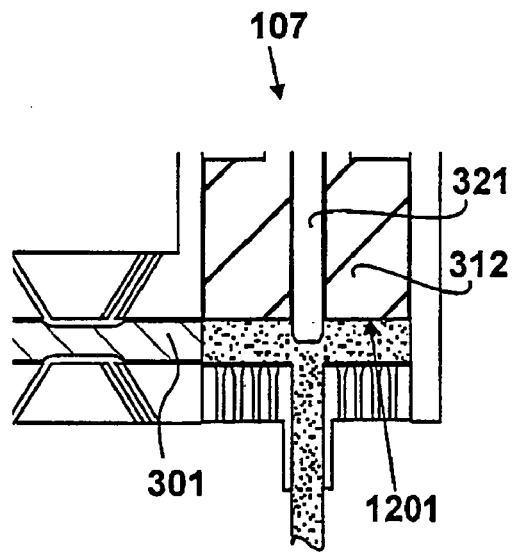
FIG. 12A to 12D show the dispensing head 107 at various configurations during an example of the fourth dispensing mode.
Figure 12B:
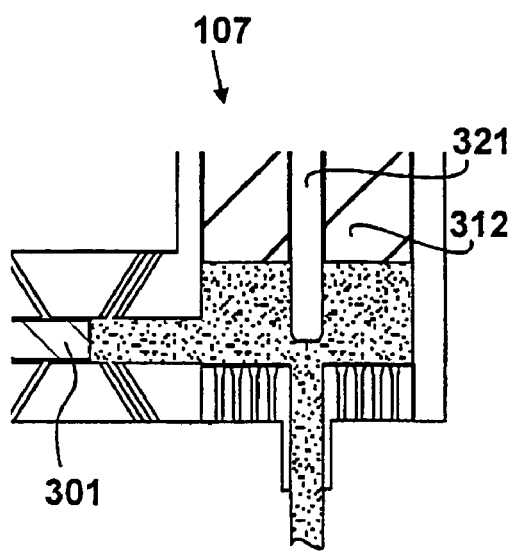
Figure 12C:
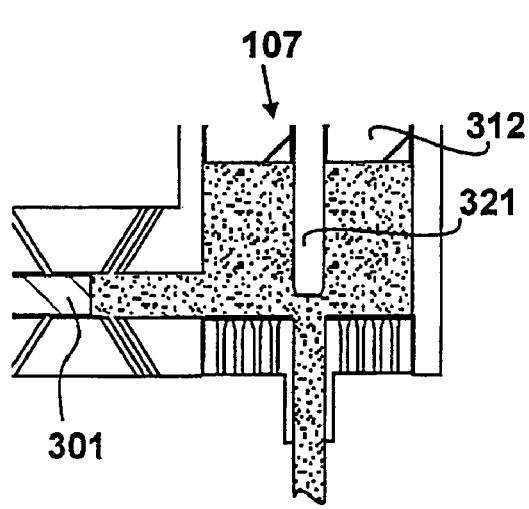
Figure 12D:
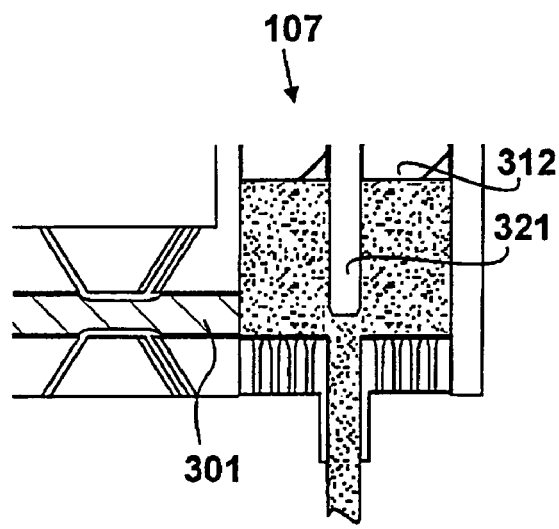

In the fourth mode of operation, the dispensing chamber is firstly charged with reacting mixture as described with reference to FIGS. 7A to 7C. The control rod 321 is then retracted and the dispensing piston 312 is moved downwards at a predetermined rate to dispense the reacting mixture stored in the dispensing chamber. Dispensing continues in this manner until the front face 1201 of dispensing piston 312 reaches the inlet of the dispensing chamber, i.e. the outlet of the production chamber as shown in FIG. 12A. At this moment, the production piston 301 is retracted so that mixing recommences and the dispensing piston is retracted at a rate calculated from the mixing rate. Specifically, the dispensing piston 312 is retracted such that dispensing continues at a rate which is the difference between the mixing rate and the rate of increase in volume of the dispensing chamber. When the dispensing chamber is recharged as shown in FIG. 12C, the production piston 301 is moved to its forward position to terminate mixing and the dispensing piston 312 is moved forward to continue dispensing as shown in FIG. 12D. When the front face 1201 of the dispensing piston reaches the inlet again, such that the dispensing head is in the configuration shown in FIG. 12A, the dispensing chamber may be refilled again while dispensing. Thus, the head 107 may be made to repeat many cycles of the process described with respect to FIGS. 12A to 12D.

In a specific example of the fourth mode of operation, the dispensing rate is arranged to be substantially the same while dispensing takes place by forward movement of the dispensing piston and while dispensing takes place during mixing and retraction of the dispensing piston. For example, suppose the dispensing head produces material at a rate of 80 ml per second, dispensing is required to be continuous at a rate of 30 ml per second and the dispensing piston has a dispensing area of 1885 mm$^2$. During the forward movement of the dispensing piston it is moved at a speed of 15.9 millimetres per second so that 15.9×1885=30000 mm$^3$ per second is dispensed (30 ml per second). During mixing of new material at a rate 80 ml per second the dispensing chamber volume is increased at a rate of 50 ml per second such that dispensing continues at a rate of 30 ml per second (80−50=30). This is achieved by moving the dispensing piston back at a speed of 26.5 mm per second, because 26.5 mms$^{-1}$×1885 mm$^2$=50000 mm$^3$ (to 3 significant figures).

It may be noted that the maximum volume of the dispensing chamber 317 in the present example is only about 120 ml. However, by this continuous mode of operation, the dispensing head 107 is able to dispense volumes of material that are many times greater than 120 ml and at rates below the rate at which the dispensing head 107 is capable of mixing material.

It will be understood that the case where the dispensing rate remains the same is one specific example of continuous dispensing, and other examples may include dispensing at several different rates. It is also envisaged that during the forward movement of the dispensing piston the production of material may be temporarily restarted to effect a temporary high rate of production.

FIG. 13

Process steps performed by the programmable logic controller 501 in order to control the production and dispensing of material are illustrated by the flow charts shown in FIGS. 13 to 26.

Figure 13:
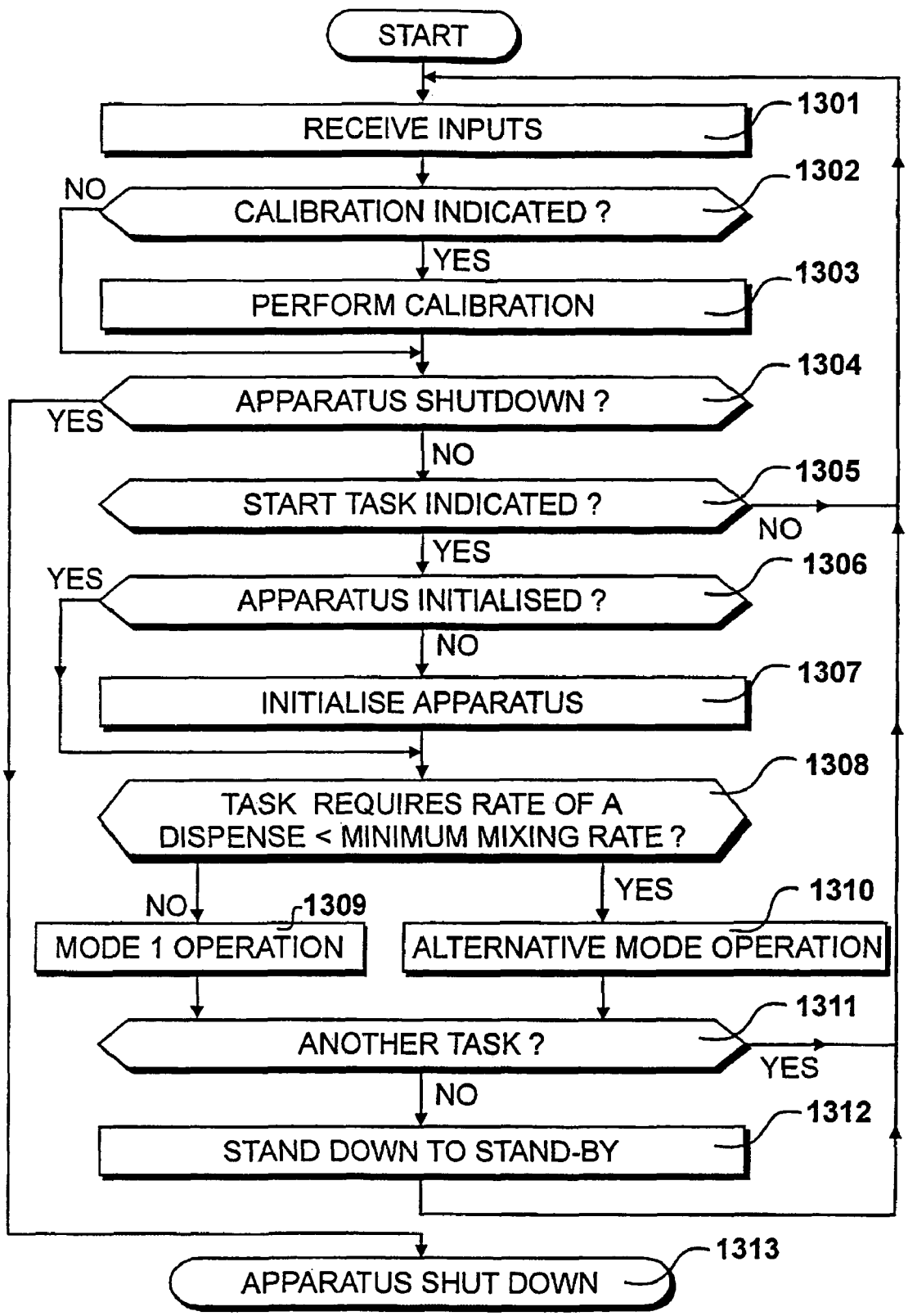
FIG. 13 shows an overview of the operation of the PLC 501.

An overview of the operation of the PLC 501 is shown in FIG. 13. Step 1301 represents a set-up procedure in which the PLC receives inputs defining a task in terms of the number of portions to be dispensed, the volume of material in each portion, the rate of dispensing material at each stage of dispensing each portion, the ratio of the chemical reagents, etc. Alternatively, the received inputs at step 1301 may include an indication to shut down. The inputs may be user inputs received via the input devices 502, or may be received at the PLC from a remote terminal, such as a computer, over a network.

After receiving inputs at step 1301, a question is asked at step 1302 to determine if a calibration procedure has been requested by the inputs. If calibration has been requested then a calibration process is performed at step 1303. Alternatively, a process enters step 1304 directly. At step 1304 it is determined whether apparatus shut down was indicated, and, if so, at step up 1313 the apparatus is shut down. If shut down is not indicated then at step 1305 it is determine whether the start of a task has been indicated. If not then the process returns to step 1301 and steps 1301 to 1305 are looped around until one of the questions at steps 1304 or 1305 is answered yes.

If the question at step 1305 is answered yes then a question is asked at step 1306 as to whether the apparatus has been initialised. If it has, then step 1308 is entered directly but otherwise the apparatus is initialised at step 1307 before step 1308 is performed.

At step 1308 a question is asked as to whether the task requires a rate of dispensing that is less than the minimum rate of mixing of the dispensing head. If the answer to this question is no, then the PLC operates the apparatus in a first mode of operation at step 1309 and as illustrated by FIGS. 6A to 6F. Alternatively, if the answer to the question at step 1308 is no then an alternative mode or modes of operation are used at step 1310. After completion of step 1309 or 1310 it is determined whether another task is to be performed at step 1311 and, if so, then step 1301 is re-entered. If another task has not been indicated then the apparatus is put into a stand-by mode at step 1312 before the process returns to step 1301.

FIG. 14

Figure 14:
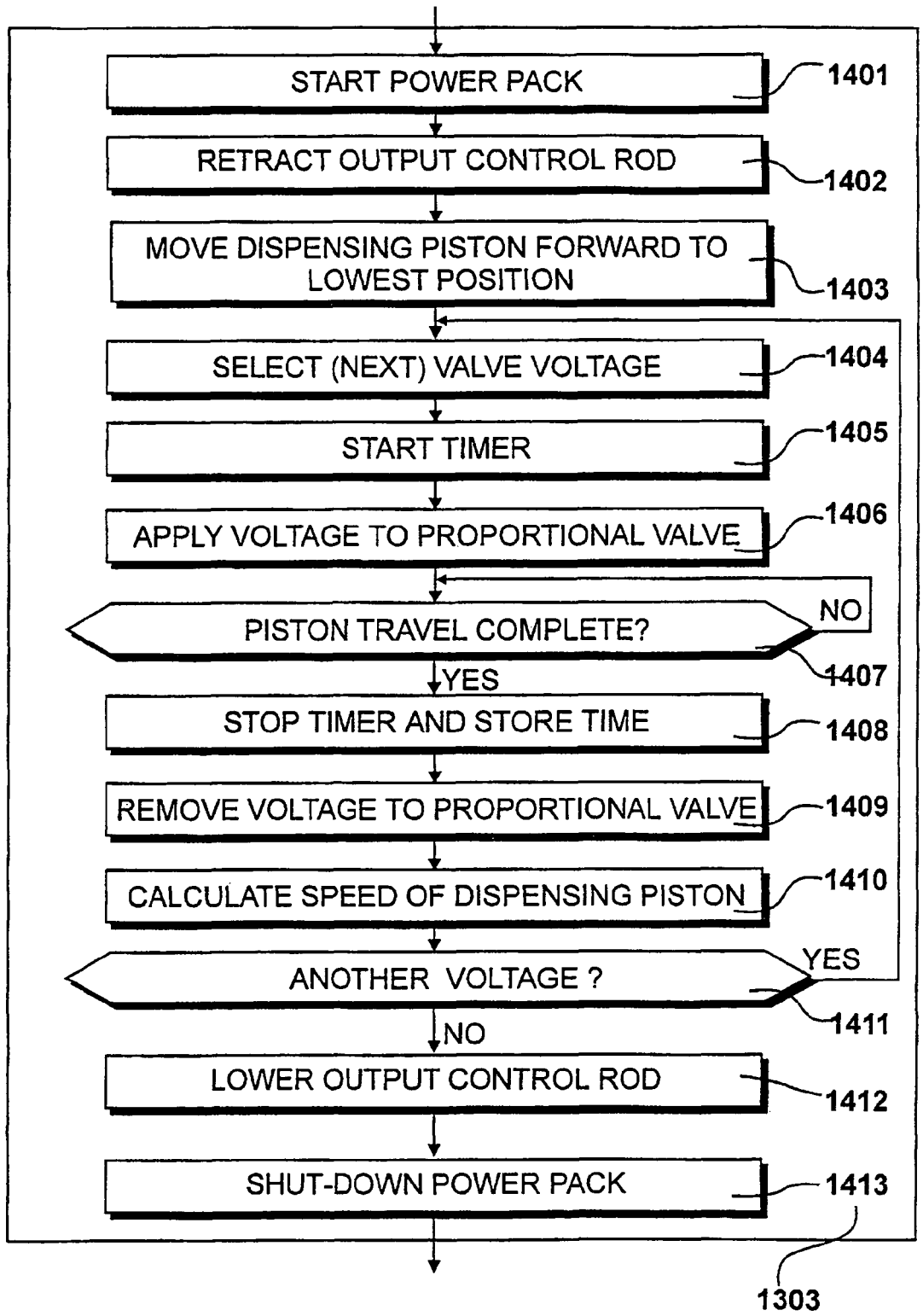
FIG. 14 shows the step 1303 of performing a calibration of the apparatus 101.
Figure 15:
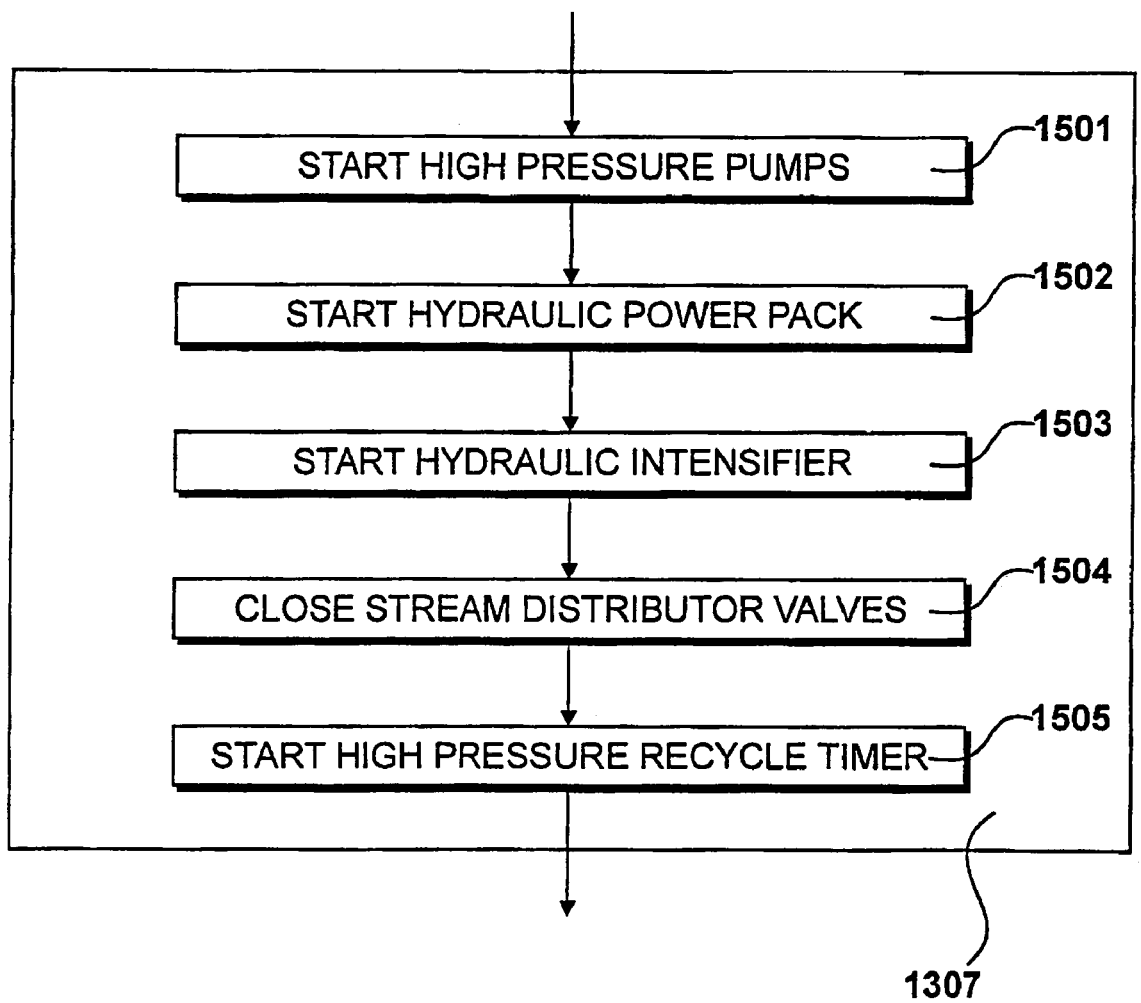
FIG. 15 shows the step 1307 of initialising the apparatus.

The step 1303 of performing a calibration of the apparatus 101 is shown in detail in the flow chart of FIG. 14.

At step 1401 the hydraulic power pack 503 is started before the output control rod 321 is retracted at step 1402. At step 1403 the dispensing piston is moved to its lowest position.

The purpose of the calibration process is to provide the PLC with nominal values for the speed of the dispensing piston, both forwards and backwards, over the range of voltages that may be applied to the proportioning valve. Thus, the PLC memory contains a list of voltage values which may be applied to the proportioning valve and in the present example the list is arranged to alternate between negative and positive values, corresponding to forward and backward movements.

At step 1404 the next of these voltage values is selected. Thus, the first time step 1404 is entered the first value in the list is selected. At step 1405 a timer within the PLC is started, and at step 1406 the selected voltage is applied to the proportioning valve. The process then awaits a signal from the position sensor 206 indicating that the dispensing piston 312 has fully completed its travel. When such a signal is received, the timer is stopped at step 1408 and the measured time is stored. The voltage applied to the proportioning valve is disconnected at step 1409 and the speed of the dispensing piston is calculated at step 1410. At step 1411 it is determined whether another voltage is to be applied, and if so, the process loops around steps 1404 to 1411 again. Thus, the process loops around steps 1404 to 1411 until all voltages in the list have been used. The question at step 1411 will then be answered no. The output control rod 321 is then returned to its closed position at step 1412 before the hydraulic power pack is shut down at step 1413 to complete step 1303.

FIG. 15

The step 1307 of initialising the apparatus is shown in detail in FIG. 9. Firstly at step 1501 the pumps 103A and 103B are started, and at step 1502 the hydraulic power pack is started in order to charge the first of two accumulators to a pressure of two hundred bar. At step 1503 the hydraulic intensifier is started to store pressure of four hundred bar in the second accumulator for use in a purging cycle.

At step 1504 the stream distribution valves 403A and 403B are closed causing the circulating chemical reagents to be pumped at high pressure through the jets in the mixing head 107. In order to ensure good mixing of the reagents, a stable high pressure of typically one hundred and fifty bars must be established before production begins. For this reason a short period of time, of typically five seconds, is provided for the establishment of this pressure before production is allowed. To measure this period, a high pressure recycle timer is started at step 1505.

FIG. 16

Figure 16:
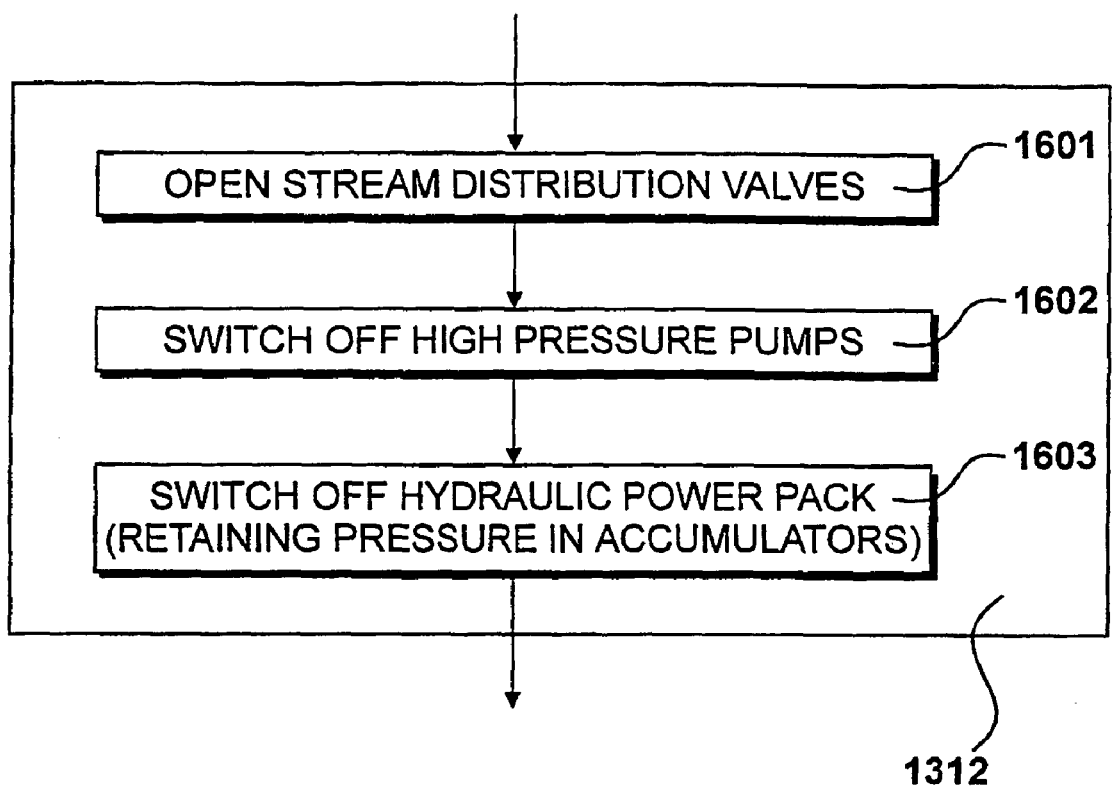
FIG. 16 shows the step 1312 of putting the apparatus into stand-by mode.

The step 1312 of putting the apparatus into stand-by mode is shown in FIG. 16. Firstly at step 1601 the stream distribution valves 403A and 403B are opened allowing the chemical reagents to circulate around the low pressure circuit instead of through the mixing head jets. The pumps 103A and 103B are then switched off at step 1602, and the hydraulic power pack is switched off at step 1603. The pressure stored in the accumulators is retained for later use.

FIG. 17

Figure 17:
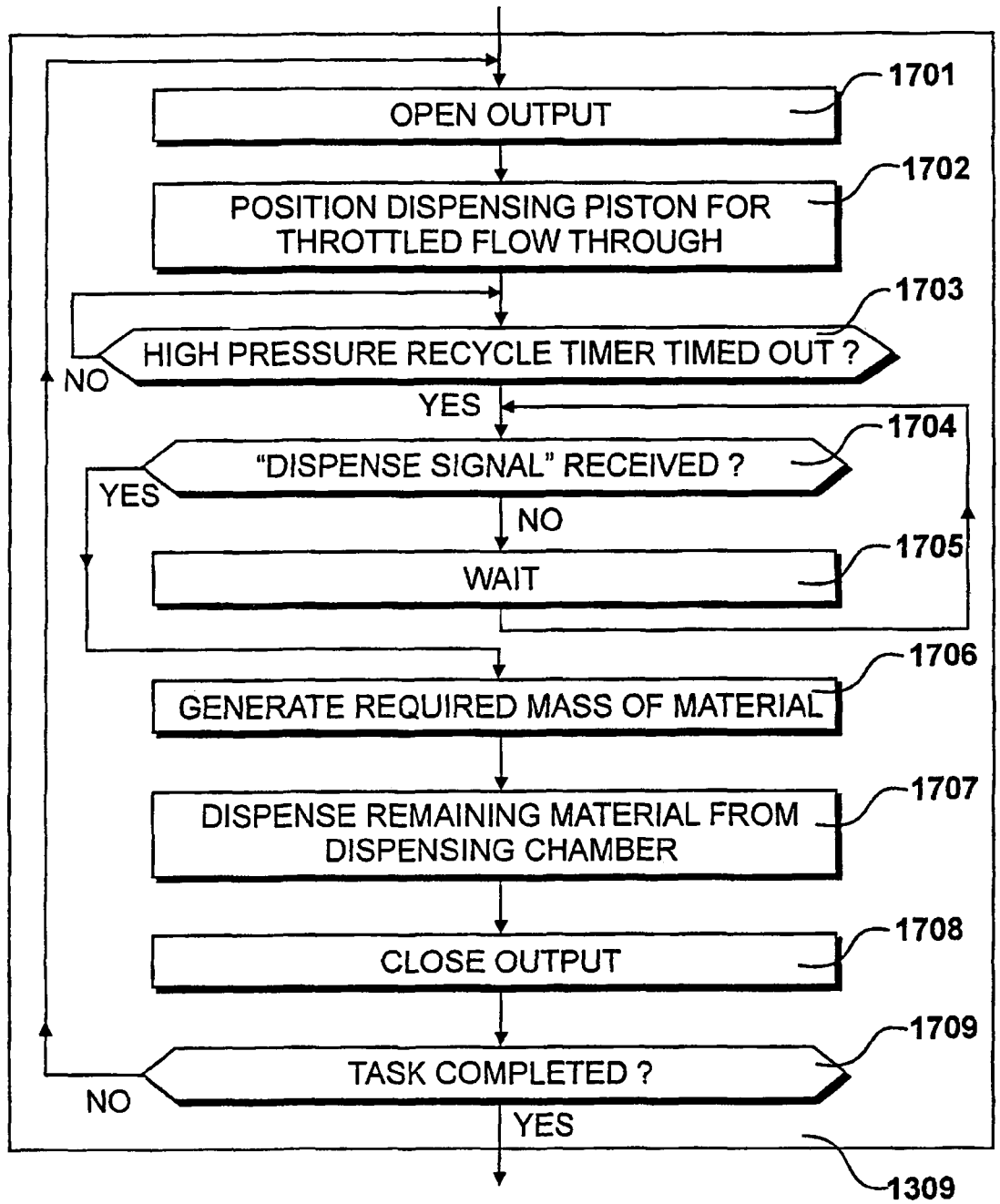
FIG. 17 shows the first mode of operation of the mixing head 107, represented by step 809.

The first mode of operation of the mixing head 107, represented by step 809, and illustrated by FIG. 6A to 6F, is shown in greater detail in FIG. 17. Firstly, at step 1701, the output port 319 is opened by retracting the output control rod 321.

Then at step 1102 the dispensing piston is moved back under the control of the proportioning valve to the throttled position as described with reference to FIG. 6B.

At step 1703 it is determined whether or not the high pressure recycle timer, started at step 1505, has timed out. When it has, the process moves on to step 1704 where it is determined whether or not a signal has been received indicating that dispensing is required. This signal may be a user input or a signal from an electro-mechanical manipulator. For example, in the example provided by FIG. 1, the signal may be received from the conveyor equipment confirming that it has been started. If the dispense signal has not yet been received, a wait state is entered at step 1705 before the question at step 1704 is asked again. Thus this wait loop continues until the dispense signal is received, at which time step 1706 is entered.

At step 1706 the required mass of material is produced and simultaneously dispensed. At step 1707 the material remaining in the dispensing chamber is also dispensed by bringing the dispensing piston 312 fully forward under proportioning valve control. The output control rod 321 is then moved forward at step 1708 to close the output port 319.

At step 1709 a question is asked as to whether the current task has been completed. The current task may comprise of several cycles of dispensing a portion of material, and so further dispensing cycles may still be required. If the current task has been completed then step 1309 is completed and step 1311 is entered. Otherwise, steps 1701 to 1709 are repeatedly repeated until the question at step 1709 is answered yes.

FIG. 18

Figure 18:
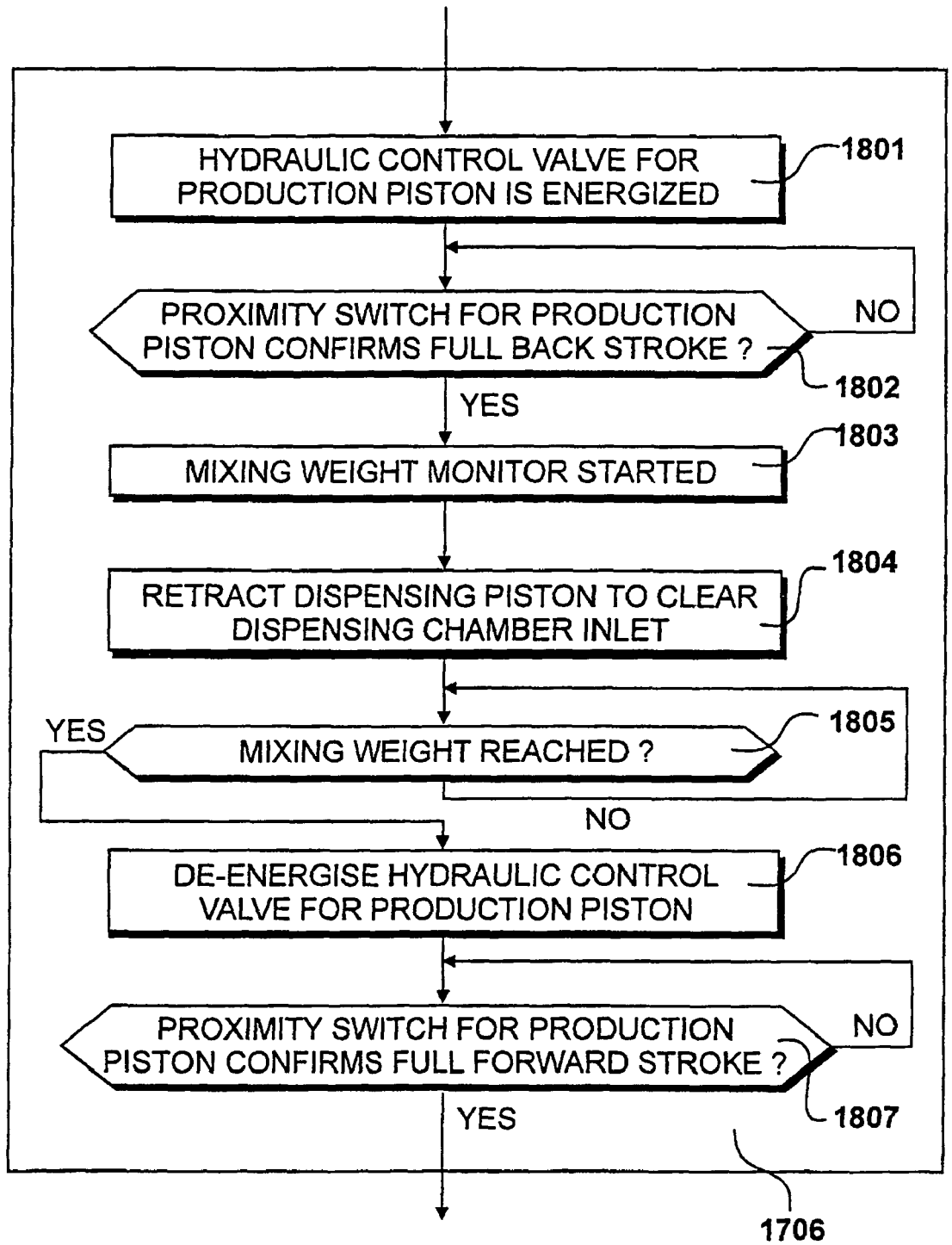
FIG. 18 shows the step 1706 of generating the required weight of material.

The step 1706 of generating the required weight of material is shown in further detail in FIG. 18. Initially at step 1801 the two-way hydraulic directional control valve 507 for the production piston 301 is energised to move said piston backwards. Then a question is repeatedly asked at step 1802 as to whether the proximity switch 205 has confirmed full back stroke of the production piston. When this question is answered yes, a mixing weight timer is started at step 1803. The dispensing piston is then retracted at step 1804 to clear the dispensing piston inlet, as shown in FIG. 6D. A question is then asked at step 1808 as to whether the mixing has taken place for the required time to generate the required weight of material. If answered no, this question is repeated, and material is generated, until it is answered yes. When this question is answered yes, the hydraulic control valve 507 for the production piston 301 is de-energised at step 1806 to move said piston forward and stop production. When the proximity switch 205 has confirmed that the production piston is fully forward at step 1807, step 1706 is completed.

FIG. 19

Figure 19:
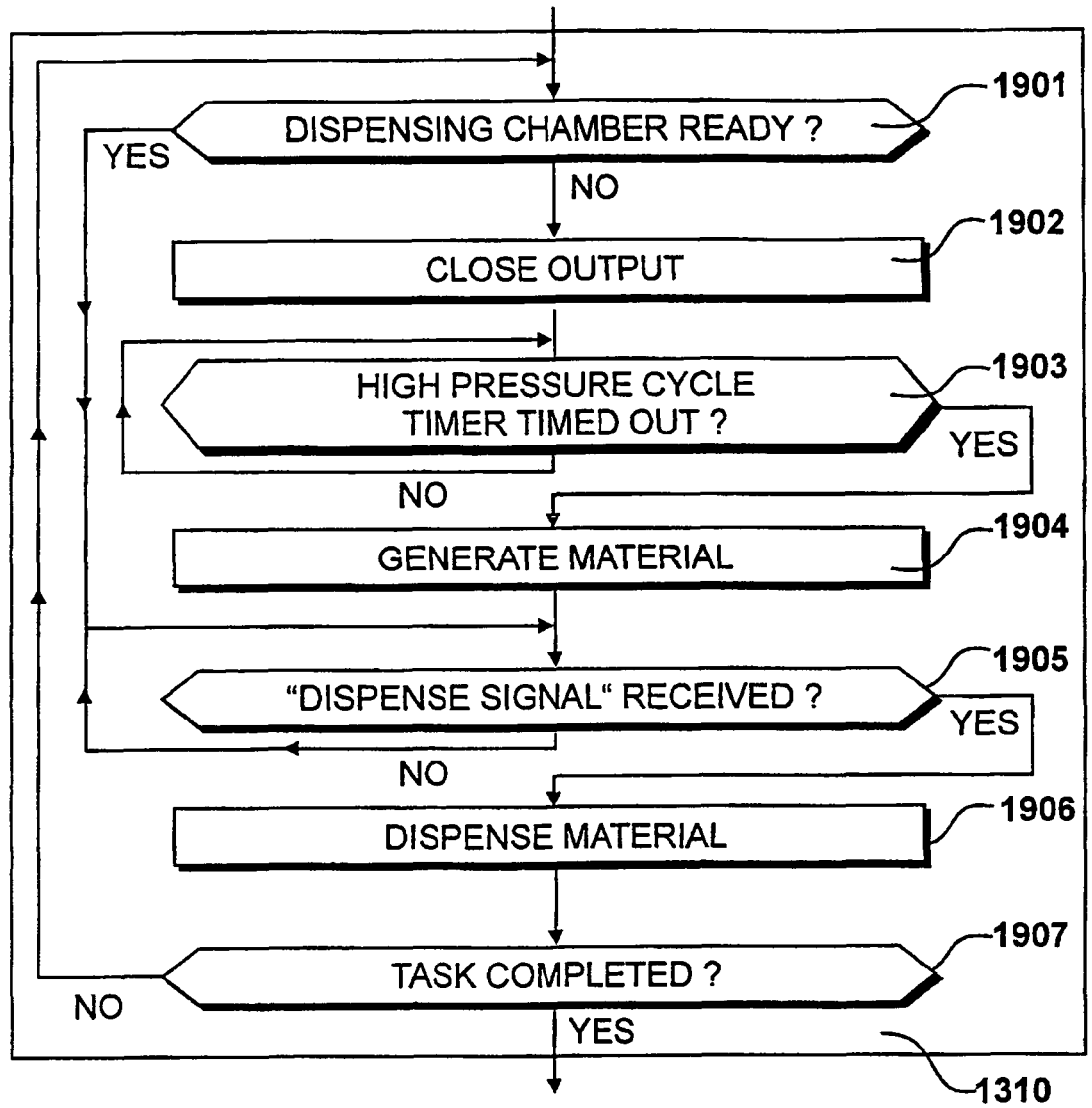
FIG. 19 shows the step 1310 of performing alternative modes of operation.

The step 1310 of performing alternative modes of operation is shown in detail in FIG. 19. Initially within step 1310, at step 1901, a question is asked as to whether the dispensing chamber is ready to dispense, i.e. does it contain material to be dispensed. On the first iteration of step 1901 this question will be answered negatively, but on subsequent iterations it may be answered in the affirmative. If the answer to this question is yes then step 1905 is entered directly, but otherwise the output port 319 is closed at step 1902. Specifically, the two-way hydraulic valve 506 for the output control rod 321 is energised to close the outlet 319.

At step 1903 it is determined whether the high pressure timer, which was started at step 1505, has timed out. This step is repeated until the timer has timed out, and then dispensable material is generated at step 1904.

Following material production, a question is asked at step 1905 as to whether a signal has been received indicating that dispensing may be started. When such a signal has not been received, step 1905 is repeated. When the dispense signal has been received, material is dispensed at step 1906. A question is then asked at step 1907 to determine if the current task is completed. (Alternatively the task may require that one or more further portions of material be dispensed.) If the question at step 1907 is answered yes, step 1310 is completed. Otherwise step 1901 is re-entered.

FIG. 20

Figure 20:
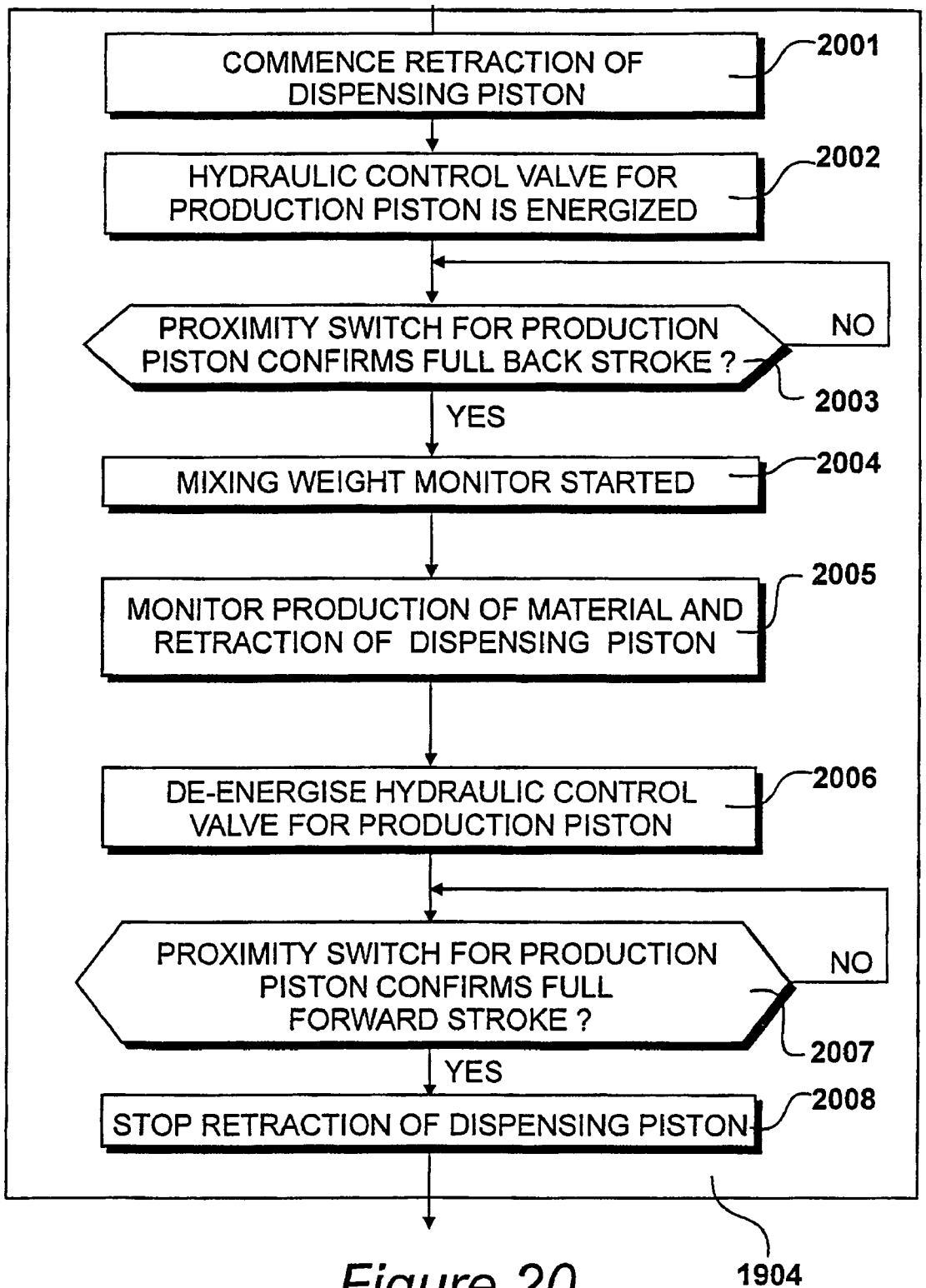
FIG. 20 shows the step 1904 of generating material.

The step 1904 of generating material is shown in further detail in FIG. 20. Initially, at step 2001, a voltage is applied to the proportioning valve such that retraction of the dispensing piston 312 is commenced. The rate of retraction, and therefore the applied voltage, depends upon the rate at which the chemical reagents are intended to be mixed. As soon as movement of the dispensing piston is commenced at step 2001, the hydraulic control valve 507 for the production piston 301 is energised at step 2002 to start mixing of the reagents. At step 2003 a question is repeatedly asked to determine whether the proximity switch has confirmed full back stroke, and, when it has, a mixing weight monitor is started at step 2004. Then, at step 2005, the production of material is monitored and the speed of the dispensing piston is adjusted if necessary until the required mass of material has been produced. (This step is described in further detail below with reference to FIG. 21.)

When the required amount of material has been produced, the hydraulic control valve 507 for the production piston 301 is de-energised at step 2006 to stop production of material. The PLC then awaits a signal from the proximity switch 205 at step 2007 indicating that the production piston has moved forward, before is stops the retraction of the dispensing piston 312 at step 2008 to complete step 1904.

FIG. 21

Figure 21:
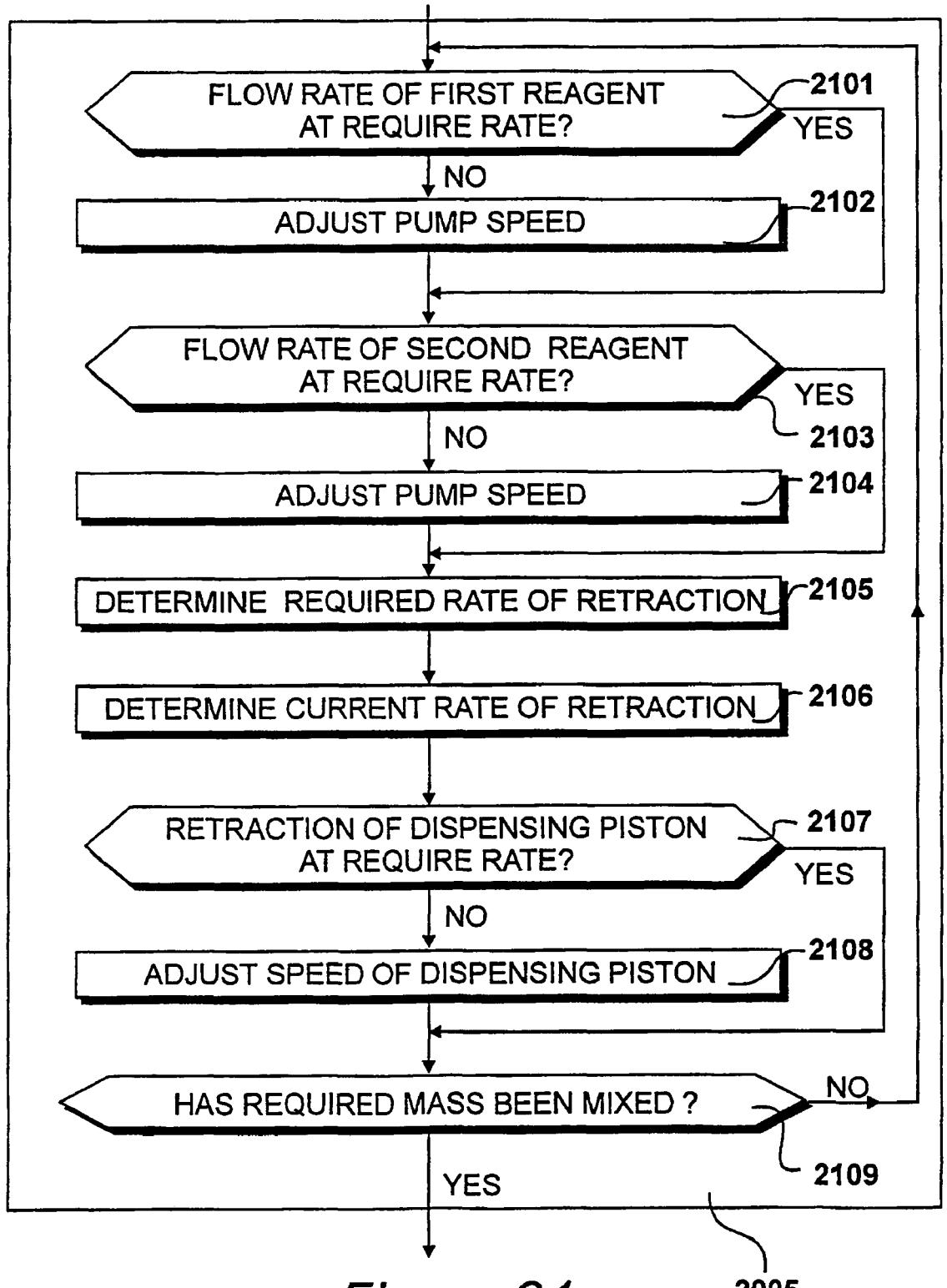
FIG. 21 shows the step 2005 of monitoring the production of material and the retraction of the dispensing piston.

The step 2005 of monitoring the production of material and the retraction of the dispensing piston is shown in further detail in FIG. 21. At step 2101 it is determined from signals received from the flow meter 409A whether the flow rate of the first reagent is at the required rate, and if not the speed of pump 111A is adjusted at step 2102 before step 2103 is entered.

At step 2103 it is determined from signals received from the flow meter 409B whether the flow rate of the second reagent is at the required rate, and if not the speed of pump 111B is adjusted at step 2104 before step 2105 is entered.

At step 2105 the rate of production of material is calculated from the flow meter rates identified at steps 2101 and 2103, to determine a new required rate of retraction of the dispensing piston.

At step 2106 the current rate of retraction of the dispensing piston is determined from signals received from the position sensor 206, and at step 2007 it is determined whether the dispensing piston is being retracted at the required rate. If it is, then step 2109 is entered directly. If it is not, then before step 2109, the speed of the dispensing piston is adjusted, at step 2107, by adjusting the voltage applied to the proportioning valve 508.

At step 2109 a question is asked as to whether the required mass of reagents have been mixed. If not then the process loops around steps 2101 to 2109 repeatedly until it is determined at step 2109 that the required mass has been mixed.

FIG. 22

Figure 22:
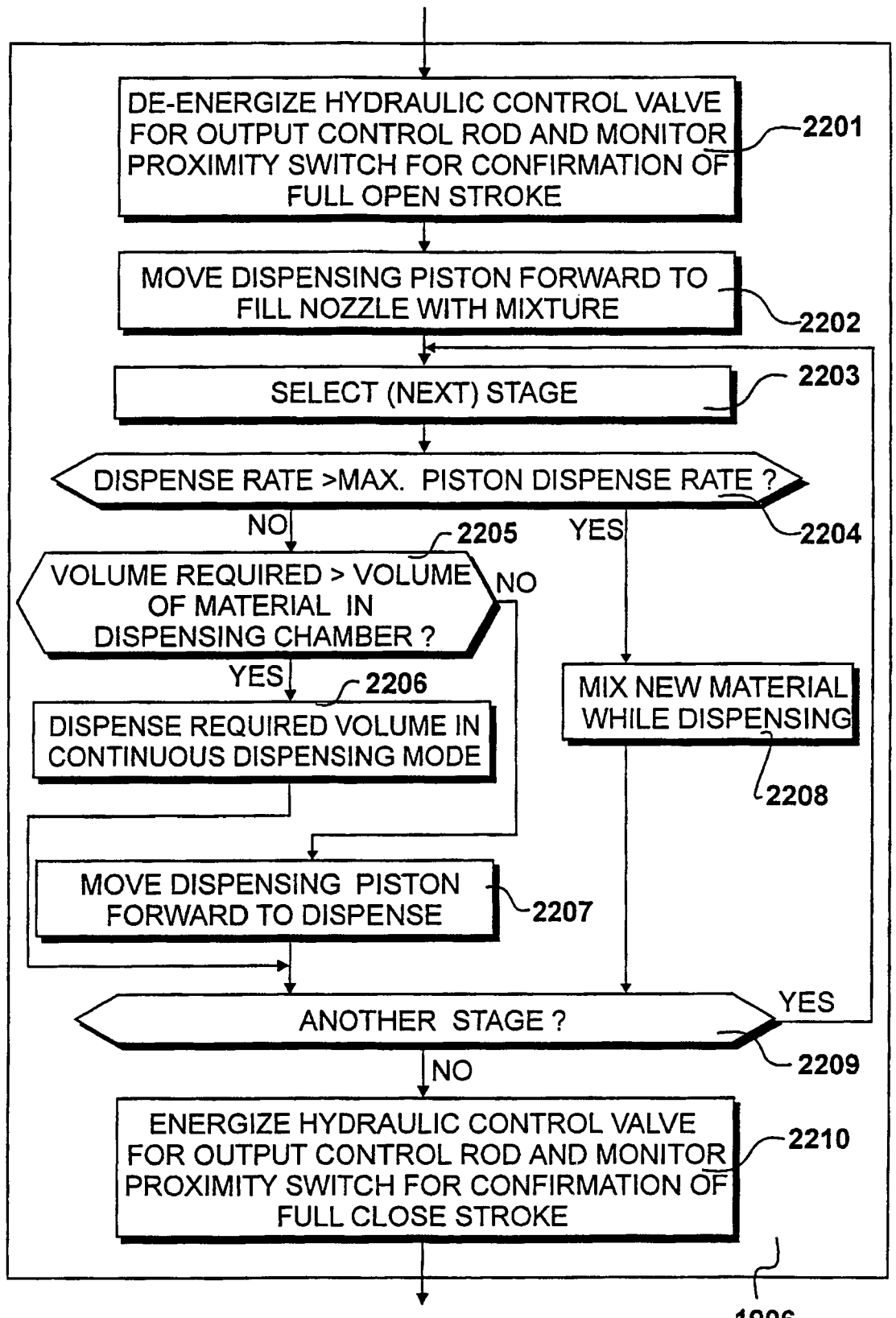
FIG. 22 shows the step 1906 of dispensing material.

The step 1906 of dispensing material is shown in detail in FIG. 22. Initially at step 2201 the outlet is opened by de-energising the hydraulic control valve 506 to retract the control rod 321. The proximity switch is monitored to ensure that the outlet is open before step 2202 is performed. At step 2202 the dispensing piston is moved forward such that the nozzle 314 is filled with mixture in a short period of time by a rapid movement of the dispensing piston. Without this fast filling of the nozzle it has been found that for low rates of dispensing, e.g. 5 ml per second, a finite period of time elapses before a normal pattern of flow from the nozzle is established. Therefore, to establish a normal pattern of flow as quickly as possible, the nozzle is filled at a predefined rate before dispensing takes place at the rates required by the task being performed.

At step 2203 the parameters for the next stage of dispensing are selected. Thus, the first time that step 2203 is entered the first stage will be selected. At step 2204 a question is asked as to whether the required dispensing rate is greater than the maximum rate provided by the piston alone. If this question is answered yes then step 2208 is performed in which new material is mixed while material is dispensed. This mode of operation was described above with respect to FIGS. 11A to 11C and will be described in further detail below in respect of FIG. 23.

If the question at step 2204 is answered in the negative, then a further question is asked at step 2205 to determine if the volume required for the current portion being dispensed is greater than the volume in the dispensing chamber. If the answered to this question is yes then material is dispensed in a continuous dispensing mode at step 2206. This mode of operation was described above with respect to FIGS. 12A to 12D and will be described in further detail below with respect to FIG. 26. If the question at step 2205 is answered no then material is dispensed at step 2207 by forward movement of the dispensing piston at a speed that is calculated to provide the required rate of dispensing.

Following step 2206, 2207 or 2208, it is determined at step 2209 as to whether the current portion of material has now been dispensed or whether another stage of dispensing must be performed. If another stage is required then step 2204 is re-entered, and steps 2208, or steps 2205 and 2206 or 2207 are performed before step 2209 is re-entered. When step 2209 is answered no, and the current portion of mixture is complete, the outlet is closed at step 2210 by lowering the output control rod 321. When the signal from the proximity switch 204 indicates that the control rod is in the closed position, step 2210 is completed and step 1906 is also completed.

FIG. 23

Figure 23:
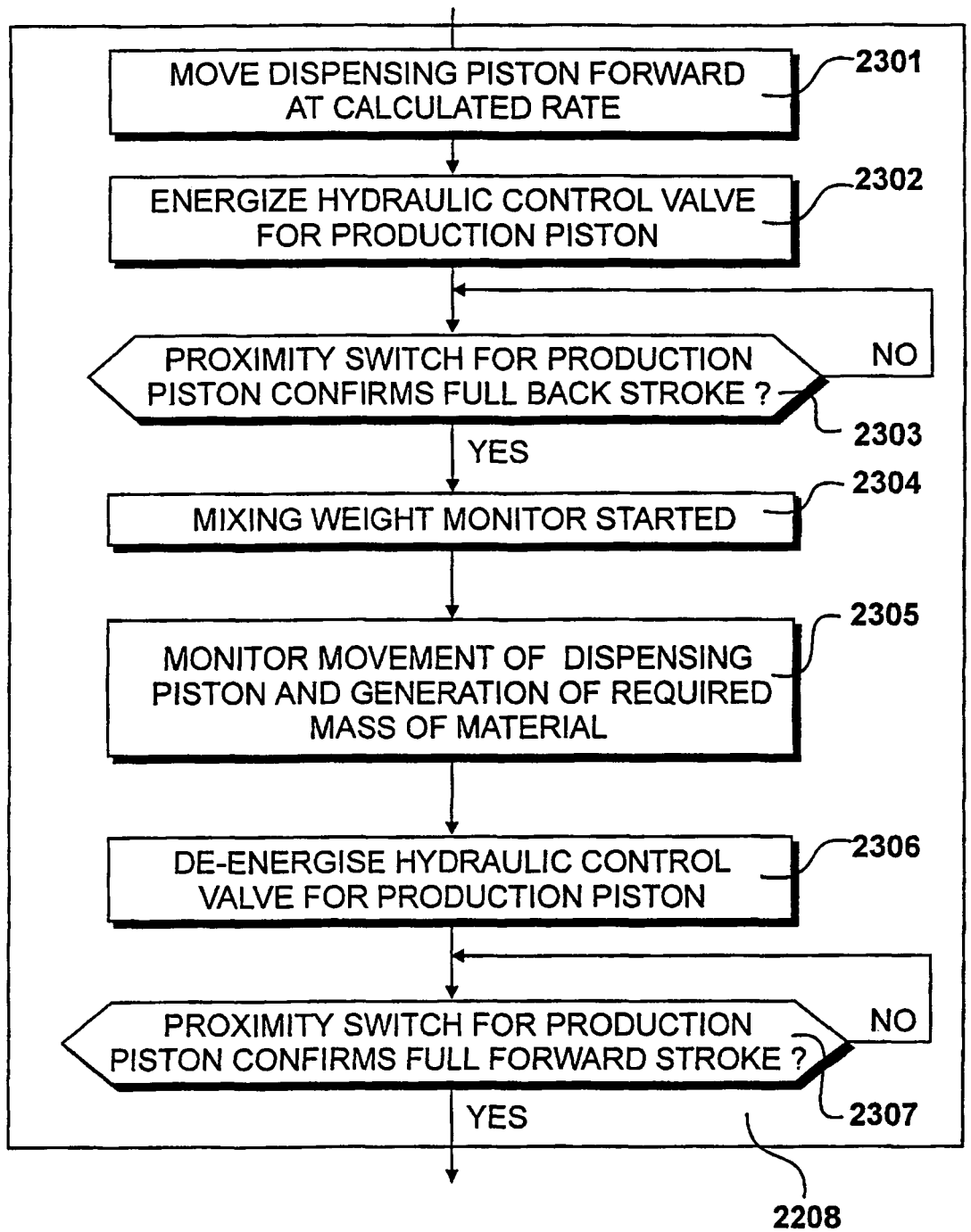
FIG. 23 shows the process step 2208 of mixing new material while simultaneously dispensing.

The process step 2208 of mixing new material while simultaneously dispensing is shown in the flow chart of FIG. 23. Initially, at step 2301, forward movement of the dispensing piston is commenced at a rate calculated from the nominal rate at which material is generated by mixing the reagents, as described with respect to FIG. 11B. Then at step 2302 the hydraulic control valve 507 for the production piton 301 is energised such that mixing of reagents is restarted. At step 2303 the process waits until a signal is received from the proximity switch 205 confirming full back stroke of the production piston. A weight monitor is then started at step 2304.

At step 2305, the production of material and movement of the dispensing piston is monitored while the required mass of material is mixed and dispensed. Thus, at step 2305 the PLC 501 monitors signals received from the flow meters 409A and 409B and position sensor 206 in a similar manner to step 2005, and when required it adjusts mixing rates by adjusting the speed of pumps 111A and 111B, and/or adjusts the dispensing piston speed by adjusting the voltage applied to the proportioning valve 508.

When the required mass of material has been mixed at step 2305, the hydraulic control valve 507 of production piston 301 is de-energised at step 2306. The process then awaits a signal from the proximity sensor 205 at step 2307 to confirm full forward stroke of the production piston and the end of mixing. On completion of step 2307, step 2208 is completed.

FIG. 24

Figure 24:
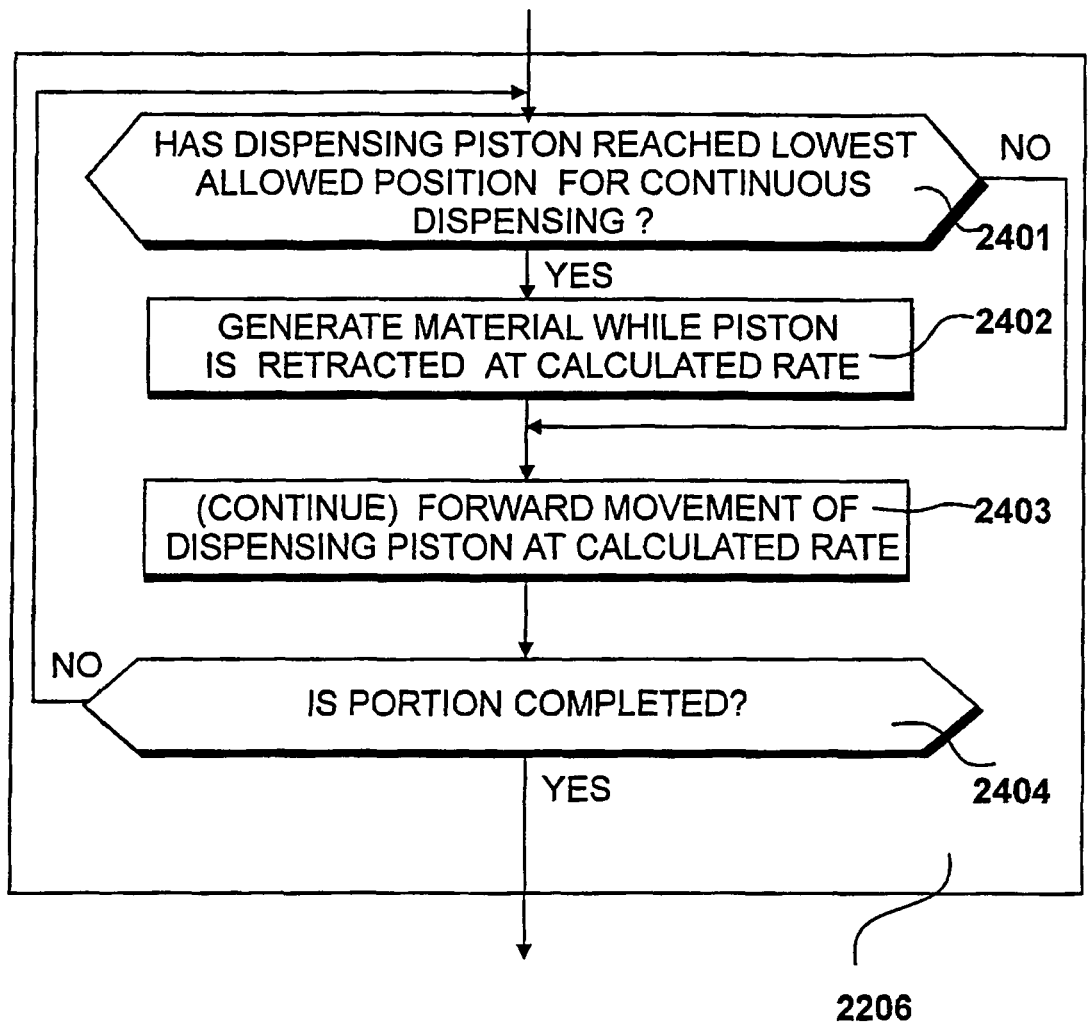
FIG. 24 shows the step 2206 of dispensing a required volume of material in a continuous dispensing mode.

The step 2206 of dispensing a required volume of material in a continuous dispensing mode is shown in the flow chart of FIG. 24. Initially, at step 2401 the PLC 501 determines from signals received from the position sensor 206 whether the dispensing piston 312 has reached a lowest allowed position. In the present example, this lowest allowed position is when the front face 1201 of the dispensing piston 312 has reached the inlet to the dispensing chamber 317. If it has not, then the dispensing piston is moved forward, at step 2403, at a speed calculated to dispense material at the required rate.

If it is found that the dispensing piston has reached the lowest allowed position at step 2401, then the process enters step 2402. At step 2402, material is generated while the dispensing piston is retracted at a rate calculated from the rate of mixing material, as described with reference to FIG. 12B. This process is similar to the process at step 2208, except that the dispensing piston is retracted at a calculated speed while mixing takes place, instead of being moved forward at a calculated speed.

After material has been generated at step 2402 the dispensing chamber 317 is again charged with mixture to be dispensed. Forward movement of the dispensing piston is then started at step 2403 so that dispensing continues at the required rate. At step 2404 a question is asked as to whether the current stage of dispensing has been completed. If it has then step 2206 is completed. If it has not then the process returns to step 2401.

Thus, the process generally loops around steps 2401, 2403 and 2404, and dispensing takes place by forward movement of the dispensing piston. However, when it is found that the dispensing chamber requires recharging at step 2401, the process recharges the dispensing chamber at step 2402 before continuing to loop around steps 2401, 2403 and 2404.

The invention claimed is:

1. Apparatus for producing material by a chemical reaction between a first chemical reagent and a second chemical reagent, comprising:
 a chemical mixing arrangement having a mixing chamber and injection means configured to produce a jet of a first chemical reagent and a jet of a second chemical reagent such that said jets collide within said mixing chamber to produce a reacting mixture;
 a dispensing chamber having an inlet for receiving said reacting mixture from said mixing chamber and an outlet for dispensing said reacting mixture;
 a dispensing piston configured to dispense said reacting mixture from said dispensing chamber;
 control means for controlling the movement of said dispensing piston and for controlling operation of the chemical mixing arrangement such that said movement of said dispensing piston is co-ordinated with said operation of said chemical mixing arrangement,
 wherein said control means is configured to cause said chemical mixing arrangement to mix said chemical reagents while simultaneously said dispensing piston is caused to move at a controlled rate.

2. Apparatus according to claim 1, wherein said control means is configured to cause said chemical mixing arrangement to mix said chemical reagents while said dispensing piston is caused to move at said controlled rate such that a rate at which reacting mixture is dispensed from said outlet at one instant depends upon the rate of mixing of the chemical reagents and the controlled rate of movement of the dispensing piston at said instant.

3. Apparatus according to claim 1, wherein said control means is configured to cause said dispensing piston to dispense reacting mixture from said dispensing chamber while said chemical mixing arrangement is not mixing, and to cause said chemical mixing arrangement to commence mixing before said dispensing piston has stopped dispensing.

4. Apparatus according to claim 3, wherein said control means is configured to cause said chemical mixing arrangement to commence mixing during a forward stroke of said dispensing piston, whereby said mixing causes a sudden increase in the rate of dispensing of reacting mixture.

5. Apparatus according to claim 3, wherein said control means is configured to cause said dispensing piston to retract at a controlled retraction rate while said chemical mixing arrangement mixes said chemical reagents at a known mixing rate, whereby material is dispensed at a rate dependent upon said controlled retraction rate and said known mixing rate.

6. Apparatus according to claim 1, wherein said control means is configured to cause said dispensing piston to dispense reacting mixture from said dispensing chamber while said chemical mixing arrangement is not mixing, and to cause said dispensing piston to retract at a controlled retraction rate while said chemical mixing arrangement mixes said chemical reagents at a known mixing rate, whereby reacting mixture is dispensed during forward movement of the dispensing piston and backward movement of the dispensing piston.

7. Apparatus according to claim 1, wherein said control means is configured to cause said dispensing piston to dispense reacting mixture from said storage chamber at a required rate while said chemical mixing arrangement is not mixing, and then to cause said chemical mixing arrangement to mix said chemical reagents at a known mixing rate while causing said dispensing piston to retract at a controlled retraction rate dependent upon said known mixing rate, whereby reacting mixture is dispensed at a required rate during forward movement of the dispensing piston and backward movement of the dispensing piston.

8. Apparatus according to claim 1, wherein said control means is configured to cause said dispensing piston and said chemical mixing arrangement to perform a plurality of cycles, wherein one of said cycles comprises the steps of:
 (a) dispensing reacting mixture at a required rate by forward movement of the dispensing piston while the chemical mixing arrangement is not mixing; and
 (b) mixing said chemical reagents at a known mixing rate while retracting the dispensing piston at a controlled retraction rate,
such that reacting mixture is dispensed continuously during a plurality of cycles.

9. Apparatus according to claim 1, wherein said control means is configured such that, when said dispensing chamber is empty of reacting mixture, mixing of said chemical reagents is commenced with said inlet to the dispensing chamber throttled by the dispensing piston, and then the dispensing piston is retracted to provide a volume to accommodate reacting mixture during said mixing, whereby quality of mixing immediately after commencement of mixing is improved by throttling the inlet.

10. Apparatus according to claim 1, wherein said apparatus comprises a closure device associated said the outlet, said closure device being moveable under the control of said control means between an open position in which the closure device allows dispensing through the outlet, and a closed position in which the closure device prevents dispensing through the outlet.

11. Apparatus according to claim 10, wherein said control means is configured to cause said dispensing piston to retract at a controlled retraction rate while said closure device is in the closed position and said chemical mixing arrangement mixes said chemical reagents at a known mixing rate.

12. Apparatus according to claim 1, wherein said apparatus further comprises a position measurement device configured to provide a signal to said control means indicative of the position of said dispensing piston as it moves along said storage chamber.

13. A method of dispensing material produced by a chemical reaction between a first chemical reagent and a second chemical reagent, comprising the steps of:
producing a reacting mixture by injecting into a mixing chamber a jet of a first chemical reagent and a jet of a second chemical reagent such that said jets collide and said reagents mix together;
allowing said reacting mixture to flow into a dispensing chamber having an outlet for dispensing said reacting mixture;
moving a dispensing piston such that said reacting mixture is dispensed from said dispensing chamber; and
controlling and co-ordinating the production of said reacting mixture and the movement of the dispensing piston such that the production of reacting mixture occurs while simultaneously said dispensing piston is moved at a controlled rate.

14. A method of dispensing material according to claim 13, wherein said chemical reagents are mixed at a known rate of mixing while said dispensing piston is moved at said controlled rate such that a rate at which reacting mixture is dispensed from said outlet at one instant depends upon the rate of mixing of the chemical reagents and the controlled rate of movement of the dispensing piston at said instant.

15. A method of dispensing material according to claim 13, wherein said dispensing piston dispenses reacting mixture from said dispensing chamber while said chemical mixing arrangement is not mixing, and said production of reacting mixture is commenced before said dispensing piston has stopped dispensing such that dispensing continues during production of reacting mixture.

16. A method of dispensing material according to claim 13, wherein said production of reacting mixture is commenced during a forward stroke of said dispensing piston, whereby said production causes a sudden increase in the rate of dispensing of reacting mixture.

17. A method of dispensing material according to claim 15, wherein said dispensing piston is retracted at a controlled retraction rate while said chemical reagents are mixed at a known mixing rate, whereby material is dispensed at a rate dependent upon said controlled retraction rate and said known mixing rate.

18. A method of dispensing material according to claim 13, wherein said dispensing piston is caused to dispense reacting mixture from said dispensing chamber while reacting mixture is not being produced, and to cause said dispensing piston to retract at a controlled retraction rate while said chemical reagents are mixed at a known mixing rate, such that reacting mixture is dispensed during forward movement of the dispensing piston and backward movement of the dispensing piston.

19. A method of dispensing material according to claim 13, wherein said dispensing piston moves forward to dispense reacting mixture from said dispensing chamber at a required rate while said reacting mixture is not being produced, and then said chemical reagents are mixed at a known mixing rate while said dispensing piston is retracted at a controlled retraction rate dependent upon said known mixing rate, whereby reacting mixture is dispensed at a required rate during forward movement of the dispensing piston and backward movement of the dispensing piston.

20. A method of dispensing material according to claim 13, wherein said method comprises a plurality of cycles in which each cycle comprises the steps of:
(a) dispensing reacting mixture at a required rate by forward movement of the dispensing piston while reacting mixture is not being produced; and
(b) mixing said chemical reagents at a known mixing rate while retracting the dispensing piston at a controlled retraction rate,
whereby reacting mixture is dispensed continuously during a plurality of cycles.

21. A method of dispensing material according to claim 13, wherein said method includes the steps of:
detecting that the dispensing chamber is empty of reacting mixture,
commencing the mixing of said chemical reagents with a passage to the dispensing chamber throttled by the dispensing piston; and
retracting the dispensing piston to provide a volume to accommodate reacting mixture produced during said mixing,
thereby improving the quality of mixing immediately after commencement of mixing.

22. A method of dispensing material according to claim 13, wherein said outlet has an associated closure device and said method includes moving said closure device from an open position in which the closure device allows dispensing through the outlet to a closed position in which the closure device prevents dispensing through the outlet.

23. A method of dispensing material according to claim 22, wherein said method includes the step of retracting said dispensing piston at a controlled retraction rate while said closure device is in the closed position and said chemical reagents are mixed at a known mixing rate.

24. A method of dispensing material according to claim 13, wherein said dispensing piston has an associated, and said method comprises the step of monitoring the position of said dispensing piston as it moves along said storage chamber by receiving signals from said position measurement device.

25. Instructions executable by a programmable logic controller such that when executing said instructions said programmable logic controller will control and co-ordinate the production of reacting mixture and movement of the dispensing piston in the methods as defined by claim 13.

* * * * *